(12) United States Patent
Kiya

(10) Patent No.: US 9,762,062 B2
(45) Date of Patent: Sep. 12, 2017

(54) VOLTAGE OUTPUT CIRCUIT, ELECTRONIC APPARATUS, MOVING OBJECT, MANUFACTURING METHOD FOR VOLTAGE OUTPUT CIRCUIT, AND MANUFACTURING METHOD FOR ELECTRONIC APPARATUS

(71) Applicant: Seiko Epson Corporation, Tokyo (JP)

(72) Inventor: Hiroshi Kiya, Suwa (JP)

(73) Assignee: Seiko Epson Corporation (JP)

( * ) Notice: Subject to any disclaimer, the term of this patent is extended or adjusted under 35 U.S.C. 154(b) by 646 days.

(21) Appl. No.: 14/338,445

(22) Filed: Jul. 23, 2014

(65) Prior Publication Data

US 2015/0028676 A1 Jan. 29, 2015

(30) Foreign Application Priority Data

Jul. 24, 2013 (JP) .................................. 2013-153578

(51) Int. Cl.
*H02J 1/00* (2006.01)
*H02J 3/28* (2006.01)
*G06F 1/26* (2006.01)
*H02J 9/06* (2006.01)

(52) U.S. Cl.
CPC ............... *H02J 3/28* (2013.01); *G06F 1/263* (2013.01); *H02J 9/061* (2013.01); *Y10T 29/49105* (2015.01); *Y10T 307/549* (2015.04)

(58) Field of Classification Search
CPC .. H02J 3/28; H02J 9/061; G06F 1/263; Y10T 29/49105; Y10T 307/549
See application file for complete search history.

(56) References Cited

U.S. PATENT DOCUMENTS

| | | | | |
|---|---|---|---|---|
| 4,492,876 A | * | 1/1985 | Colbert | .................. H02J 9/061 307/66 |
| 4,617,473 A | * | 10/1986 | Bingham | ................ H02J 9/061 307/66 |
| 4,812,672 A | * | 3/1989 | Cowan | .................... H02J 9/061 307/43 |

(Continued)

FOREIGN PATENT DOCUMENTS

| | | |
|---|---|---|
| JP | 2000-124976 A | 4/2000 |
| JP | 2002-091575 A | 3/2002 |

(Continued)

*Primary Examiner* — Daniel Cavallari
(74) *Attorney, Agent, or Firm* — Harness, Dickey & Pierce, P.L.C.

(57) ABSTRACT

A voltage output circuit includes a first power supply terminal, a second power supply terminal, an output terminal, a switch circuit present in a supply path of a voltage from the second power supply terminal to the output terminal and configured to supply the voltage from the second power supply terminal to the output terminal when the switch circuit is in a closed state and interrupt the supply of the voltage from the second power supply terminal to the output terminal when the switch circuit is in an open state, a switch control circuit configured to fix the switch circuit in the open state on the basis of the voltage at the second power supply terminal, and a switch control circuit configured to release the fixing of the open state of the switch circuit on the basis of the voltage at the first power supply terminal.

15 Claims, 12 Drawing Sheets

(56) References Cited

U.S. PATENT DOCUMENTS

| | | | | |
|---|---|---|---|---|
| 4,908,790 A | * | 3/1990 | Little | G06F 1/30 |
| | | | | 307/66 |
| 5,191,229 A | * | 3/1993 | Davis | H02J 9/061 |
| | | | | 307/64 |
| 5,306,961 A | * | 4/1994 | Leo | G06F 3/0383 |
| | | | | 307/66 |
| 5,886,561 A | * | 3/1999 | Eitan | H02J 9/061 |
| | | | | 307/64 |
| 6,600,239 B2 | * | 7/2003 | Winick | H02J 1/102 |
| | | | | 307/85 |
| 2006/0006740 A1 | | 1/2006 | Sugiyama | |

FOREIGN PATENT DOCUMENTS

| | | |
|---|---|---|
| JP | 2002-091583 A | 3/2002 |
| JP | 2002-091588 A | 3/2002 |
| JP | 2002-091591 A | 3/2002 |
| JP | 2005-045873 A | 2/2005 |
| JP | 2008-086100 A | 4/2008 |
| JP | 2009-131129 A | 6/2009 |

\* cited by examiner

VOLTAGE OUTPUT CIRCUIT, ELECTRONIC APPARATUS, MOVING OBJECT, MANUFACTURING METHOD FOR VOLTAGE OUTPUT CIRCUIT, AND MANUFACTURING METHOD FOR ELECTRONIC APPARATUS

BACKGROUND

1. Technical Field

The present invention relates to a voltage output circuit, an electronic apparatus, a moving object, a manufacturing method for the voltage output circuit, and a manufacturing method for the electronic apparatus.

2. Related Art

A real-time clock (RTC) circuit and the like are circuits including a clocking function and are incorporated in a variety of electronic apparatuses such as a personal computer. In general, the RTC circuit and the like are required to continue clocking even when main power supplies of the electronic apparatuses are disconnected or when main power is not temporarily supplied because of momentary power interruption. Therefore, circuits for detecting that the main power supplies are interrupted and switching power supplies of the RTC circuit and the like to backup power supplies are provided. For example, JP-A-2009-131129 (Patent Literature 1) proposes a power supply switching circuit that, when a voltage of a main power supply is equal to or higher than a switching voltage, charges a backup power supply with the main power supply and supplies electric power to an RTC circuit and, when the voltage of the main power supply drops to a voltage lower than the switching voltage, disconnects the main power supply and the RTC circuit and supplies electric power from the backup power supply to the RTC circuit.

However, in the power supply switching circuit described in Patent Literature 1, for example, in assembly of an electronic apparatus, when the main power supply is incorporated after the backup power supply is incorporated, power supply from the backup power supply to the RTC circuit is unnecessary before the main power supply is started after the backup power supply is incorporated. However electric power is supplied from the backup power supply to the RTC circuit. Therefore, electric power accumulated in the backup power supply is consumed. In particular, when the backup power supply is a primary battery, the backup power supply cannot be charged after the assembly of the electronic apparatus. Therefore, this problem is serious.

SUMMARY

An advantage of some aspects of the invention is to provide a voltage output circuit, an electronic apparatus, a moving object, a manufacturing method for the voltage output circuit, and a manufacturing method for the electronic apparatus capable of suppressing, even if a second power supply (e.g., a backup power supply) is connected earlier than a first power supply (e.g., a main power supply), useless consumption of electric power of the second power supply.

The invention can be implemented as the following forms or application examples.

Application Example 1

A voltage output circuit according to this application example includes: a first power supply terminal; a second power supply terminal; an output terminal; a first switch unit present in a supply path of a voltage from the second power supply terminal to the output terminal and configured to supply the voltage from the second power supply terminal to the output terminal when the first switch unit is in a closed state and interrupt supply of the voltage from the second power supply terminal to the output terminal when the first switch unit is in an open state; a first control unit configured to fix the first switch unit in the open state on the basis of the voltage at the second power supply terminal; and a second control unit configured to release the fixing of the open state of the first switch unit on the basis of the voltage at the first power supply terminal.

With the voltage output circuit according to this application example, since the first switch unit is fixed in the open state on the basis of the voltage at the second power supply terminal, the supply of the voltage from the second power supply terminal to the output terminal is interrupted irrespective of the voltage at the first power supply terminal. Therefore, even if a second power supply is connected to the second power supply terminal before a first power supply is connected to the first power supply terminal, it is possible to suppress useless consumption of electric power of the second power supply.

With the voltage output circuit according to this application example, the fixing of the open state of the first switch unit is released on the basis of the voltage at the first power supply terminal. Therefore, after the first power supply is connected to the first power supply terminal, it is possible to shift the first switch unit from the open state to the closed state or from the closed state to the open state.

Application Example 2

In the voltage output circuit according to the application example described above, the first control unit may include a power-on reset circuit configured to output a reset signal according to application of the voltage from the second power supply terminal and may fix the first switch unit in the open state according to the reset signal.

With the voltage output circuit according to this application example, when the second power supply is connected to the second power supply terminal, the reset signal is generated and the first switch unit is fixed in the open state. Therefore, it is possible to suppress useless consumption of the electric power of the second power supply when the first power supply is not connected to the first power supply terminal.

Application Example 3

In the voltage output circuit according to the application example described above, the first switch unit may include a switch element, and the first control unit may apply fixed potential to a control terminal of the switch element according to the reset signal and fix the first switch unit in the open state.

Application Example 4

In the voltage output circuit according to the application example described above, the switch element of the first switch unit may include a diode forward-connected in a direction from the output terminal to the second power supply terminal.

With the voltage output circuit according to this application example, when the first switch unit is in the open state, an electric current from the second power supply terminal to the output terminal is interrupted and the electric current flows from the output terminal to the second power supply terminal via the diode. Therefore, when the first switch unit is in the open state, it is possible to charge the second power supply while suppressing a backflow of the electric current from the second power supply connected to the second power supply terminal.

Application Example 5

In the voltage output circuit according to the application example described above, the second control unit may output a release signal on the basis of the voltage at the first power supply terminal, and the first control unit may include a latch circuit and fix the first switch unit in the open state on the basis of an input of the reset signal to the latch circuit and release the fixing of the open state of the first switch unit on the basis of an input of the release signal to the latch circuit.

With the voltage output circuit according to this application example, when the second power supply is connected to the second power supply terminal, the reset signal is generated and the first switch unit is fixed in the open state by the latch circuit. Therefore, it is possible to suppress useless consumption of the electric power of the second power supply when the first power supply is not connected to the first power supply terminal.

With the voltage output circuit according to this application example, the fixing of the open state of the first switch unit is released on the basis of the release signal output by the second control unit. Therefore, after the second unit outputs the release signal after the first power supply is connected to the first power supply terminal, it is possible to shift the first switch unit from the open state to the closed state or from the closed state to the open state.

Application Example 6

In the voltage output circuit according to the application example described above, the voltage output circuit may further include a second switch unit present on a supply path of the voltage from the first power supply terminal to the output terminal and configured to interrupt the supply of an electric current from the second power supply terminal to the first power supply terminal when the second switch is in the open state.

With the voltage output circuit according to this application example, it is possible to prevent a backflow of the electric current from the second power supply terminal to the first power supply terminal when the second switch unit is in the open state.

Application Example 7

An electronic apparatus according to this application example includes the voltage output circuit according to any one of the application examples described above.

Application Example 8

A moving object according to this application example includes the voltage output circuit according to any one of the application examples described above.

Application Example 9

A manufacturing method for a voltage output circuit according to this application example includes: preparing a circuit including a first power supply terminal, a second power supply terminal, an output terminal, a first switch unit present in a supply path of a voltage from the second power supply terminal to the output terminal and configured to supply the voltage from the second power supply terminal to the output terminal when the first switch unit is in a closed state and interrupt the supply of the voltage from the second power supply terminal to the output terminal when the first switch unit is in an open state, a first control unit configured to fix the first switch unit in the open state on the basis of the voltage at the second power supply terminal, and a second control unit configured to release the fixing of the open state of the first switch unit on the basis of the voltage at the first power supply terminal; applying a second power supply voltage to the second power supply terminal of the first power supply terminal and the second power supply terminal and fixing the first switch unit in the open state; and applying a first power supply voltage to the first power supply terminal in a state in which the second power supply voltage is applied to the second power supply terminal and releasing the fixing of the open state of the first switch unit.

With the manufacturing method for the voltage output circuit according to this application example, the second power supply voltage is applied to the second power supply terminal before the first power supply voltage is applied to the first power supply terminal. However, when the first switch unit is fixed in the open state, the supply of the voltage from the second power supply terminal to the output terminal is interrupted. Therefore, it is possible to suppress useless consumption of electric power of a second power supply connected to the second power supply terminal.

Application Example 10

A manufacturing method for an electronic apparatus according to this application example includes: preparing a voltage output circuit including a first power supply terminal, a second power supply terminal, an output terminal, a first switch unit present in a supply path of a voltage from the second power supply terminal to the output terminal and configured to supply the voltage from the second power supply terminal to the output terminal when the first switch unit is in a closed state and interrupt the supply of the voltage from the second power supply terminal to the output terminal when the first switch unit is in an open state, a first control unit configured to fix the first switch unit in the open state on the basis of the voltage at the second power supply terminal, and a second control unit configured to release the fixing of the open state of the first switch unit on the basis of the voltage at the first power supply terminal; applying a second power supply voltage to the second power supply terminal of the first power supply terminal and the second power supply terminal and fixing the first switch unit in the open state; applying a first power supply voltage to the first power supply terminal in a state in which the second power supply voltage is applied to the second power supply terminal and releasing the fixing of the open state of the first switch unit; and incorporating the voltage output circuit in the electronic apparatus after the applying the second power supply voltage and before the applying the first power supply voltage.

With the manufacturing method for the electronic apparatus according to this application example, the second power supply voltage is applied to the second power supply terminal of the voltage output circuit before the first power supply voltage is applied to the first power supply terminal of the voltage output circuit. However, when the first switch unit of the voltage output circuit is fixed in the open state, the supply of the voltage from the second power supply terminal to the output terminal is interrupted. Therefore, it is possible to suppress useless consumption of electric power of a second power supply connected to the second power supply terminal of the voltage output circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

A preferred embodiment of the invention is explained in detail below with reference to the drawings. Note that the embodiment explained below does not unduly limit contents of the invention described in the appended claims. All components explained below are not always essential constituent features of the invention.

1. Voltage Output Circuit
1-1. Circuit Configuration

Figure 1:
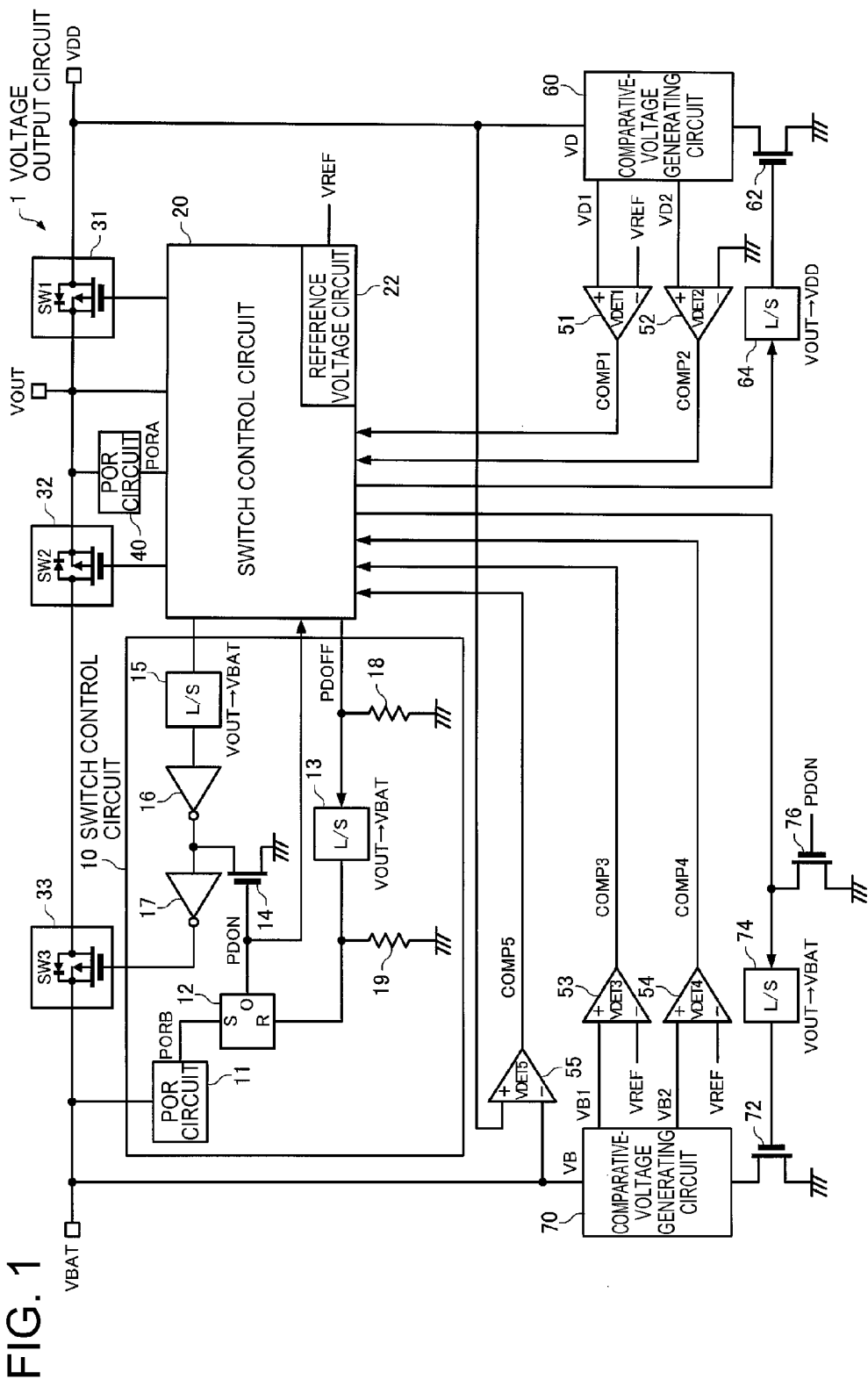
FIG. 1 is a diagram showing a configuration example of a voltage output circuit in an embodiment.

FIG. 1 is a diagram showing a configuration example of a voltage output circuit in an embodiment. A voltage output circuit 1 in this embodiment includes a switch control circuit 10, a switch control circuit 20, a switch circuit 31, a switch circuit 32, a switch circuit 33, a power-on reset (POR) circuit 40, a comparator 50, a comparator 52, a comparator 53, a comparator 54, a comparator 55, a comparative-voltage generating circuit 60, an NMOS switch 62, a level shift circuit 64, a comparative-voltage generating circuit 70, an NMOS switch 72, a level shift circuit 74, and an NMOS switch 76. However, in the voltage output circuit 1 in this embodiment, a part of the components may be omitted or changed or other components may be added.

The voltage output circuit 1 in this embodiment includes two power supply terminals, i.e., a VDD terminal and a VBAT terminal, and a VOUT terminal.

The VDD terminal (an example of a first power supply terminal) is a terminal to which a main power supply is connected. The VBAT terminal (an example of a second power supply terminal) is a terminal to which a backup power supply is connected. The backup power supply may be an un-rechargeable power supply (a primary battery, etc.) or may be a rechargeable power supply (a secondary battery, a large-capacity capacitor, etc.). In the following explanation, it is assumed that the backup power supply is the rechargeable power supply.

The VOUT terminal (an example of an output terminal) is a terminal to which various functional circuits (e.g., an RTC circuit) are connected. The functional circuits operate using, as a power supply voltage, a voltage output from the VOUT terminal.

In this embodiment, the switch control circuit 10 operates using a voltage at the VBAT terminal (a voltage of the backup power supply) as a power supply voltage. The other circuits operate using a voltage at the VDD terminal (a voltage of the main power supply) as a power supply voltage.

The switch circuit 31 (an example of a second switch unit) is present on a supply path of an electric current and a voltage from the VDD terminal to the VOUT terminal. The switch circuit 31 supplies the electric current and the voltage from the VDD terminal to the VOUT terminal when the switch circuit 31 is in a closed state (an ON state) and interrupts the supply of the electric current and the voltage from the VBAT terminal or the VOUT terminal to the VDD terminal when the switch circuit 31 is in an open state (an OFF state).

The switch circuit 32 is present on a supply path of an electric current and a voltage from the VDD terminal to the VBAT terminal. The switch circuit 32 enables the supply of the electric current and the voltage from the VDD terminal to the VBAT terminal (i.e., charging of the backup power supply) when the switch circuit 32 is in the closed state (the ON state) and interrupts the supply of the electric current and the voltage from the VDD terminal to the VBAT terminal when the switch circuit 32 is in the open state (the OFF state).

The switch circuit 33 (an example of a first switch unit) is present on a supply path of an electric current and a voltage from the VBAT terminal to the VOUT terminal. The switch circuit 33 enables the supply of the electric current and the voltage from the VBAT terminal to the VOUT terminal when the switch circuit 33 is in the closed state (the ON state) and interrupts the supply of the electric current and the voltage from the VBAT terminal to the VOUT terminal when the switch circuit 33 is in the open state (the OFF state).

In this embodiment, the switch circuits 31, 32, and 33 respectively include switch elements SW1, SW2, and SW3. In this embodiment, the switch elements SW1, SW2 and SW3 are PMOS switches. Upstream sides of the switch elements SW1, SW2, and SW3 with respect to a flowing direction of an electric current are sources and downstream sides thereof are drains. The switch elements SW1, SW2, and SW3 conduct the sources and the drains (turn on) when a gate voltage (a voltage at gate terminals (control terminals)) is at a low level and non-conduct the sources and the drains (turn off) when the gate voltages are at a high level.

The switch element SW1 is provided to set the VDD terminal side thereof as the source and set the VOUT terminal side thereof as the drain. The switch element SW2 is provided to set the VBAT terminal side thereof as the source and set the VOUT terminal side thereof as the drain. The switch element SW3 is provided to set the VOUT terminal side thereof as the source and set the VBAT terminal side thereof as the drain. In this embodiment, in the switch elements SW1, SW2, and SW3, diodes (body diodes), source sides of which are anodes and drain sides of which are cathodes (a direction from the sources to the drains is a forward direction), are formed between the sources and the drains. Even in the OFF state, an electric current flows in the forward direction if source potential is higher than drain potential.

When the switch element SW1 is turned off, an electric current flows only in the forward direction of the diode. Therefore, it is possible to interrupt supply of an electric current and a voltage from the VOUT terminal and the VBAT terminal to the VDD terminal. Therefore, it is possible to prevent a backflow of the electric current to the main power supply by turning off the switch element SW1.

When the switch element SW2 is turned off, an electric current flows only in the forward direction of the diode. Therefore, it is possible to interrupt supply of an electric current and a voltage from the VDD terminal to the VBAT terminal. Therefore, it is possible to stop charging of the backup power supply (prevent overcharging) by turning off the switch element SW2.

When the switch element SW3 is turned off, an electric current flows only in the forward direction of the diode. Therefore, it is possible to interrupt supply of an electric current and a voltage from the VBAT terminal and the VOUT terminal to the VDD terminal. Therefore, it is possible to suppress useless consumption of the backup power supply by turning off the switch element SW3.

The switch control circuit 10 (an example of a first control unit) is a circuit that controls opening and closing (ON and OFF) of the switch circuit 33. In this embodiment, the switch control circuit 10 includes a power-on reset (POR) circuit 11, a latch circuit 12, a level shift circuit 13, an NMOS switch 14, a level shift circuit 15, an inverter circuit 16, an inverter circuit 17, a pull-down resistor 18, and a pull-down resistor 19. However, in the switch control circuit 10 in this embodiment, a part of the components may be omitted or changed or other components may be added.

The power-on reset circuit 11 follows a voltage rise at the VBAT terminal and generates a reset signal PORB until the voltage at the VBAT terminal reaches a desired voltage.

When the reset signal PORB is input to the latch circuit 12, the latch circuit 12 generates a signal for fixing the switch circuit 33 in an open state (an OFF state). When a release signal PDOFF generated by the switch control circuit 20 is input to the latch circuit 12 via the level shift circuit 13, the latch circuit 12 generates a signal for releasing the fixing of the open state (the OFF state) of the switch circuit 33. In this embodiment, the latch circuit 12 is realized by an SR latch. When the reset signal PORB is input to the latch circuit 12, an output signal PDON changes to a high level. When the release signal PDOFF (a pulse signal) is input to the latch circuit 12, the output signal PDON changes to the low level.

A source terminal of the NMOS switch 14 is connected to the ground and a drain terminal thereof is connected to an output terminal of the inverter circuit 16 and an input terminal of the inverter circuit 17. The output signal PDON of the latch circuit 12 is input to a gate terminal (a control terminal) thereof. Therefore, when the output signal PDON is at the high level, a source and a drain of the NMOS switch 14 conduct (the NMOS switch 14 turns on) and the input terminal of the inverter circuit 17 has ground potential. An output terminal of the inverter circuit 17 is connected to the gate terminal (the control terminal) of the switch element SW3. When the output signal PDON is at the high level, the switch element SW3 is fixed in the OFF state. On the other hand, when the output signal PDON is at the low level, the source and the drain of the NMOS switch 14 do not conduct (the NMOS switch 14 is turned off). Consequently, a control signal for the switch element SW3 generated by the switch control circuit 20 is input to the gate terminal (the control terminal) of the switch element SW3 via the level shift circuit 15, the inverter circuit 16, and the inverter circuit 17. That is, the switch control circuit 20 becomes capable of controlling opening and closing (ON and OFF) of the switch element SW3.

A reference voltage circuit 22 generates a reference voltage VREF on the basis of a power supply voltage at the VOUT terminal. In FIG. 1, the reference voltage circuit 22 is a part of the switch control circuit 20. However, the reference voltage circuit 22 may be provided separately from the switch control circuit 20.

The comparative-voltage generating circuit 60 is a circuit that generates two comparative voltages VD1 and VD2 from a voltage VD at the VDD terminal. For example, the comparative-voltage generating circuit 60 divides resistance between the VDD terminal and a terminal of the NMOS switch 62 at a predetermined resistance ratio and generates the comparative voltages VD1 and VD2.

The comparator 51 compares the magnitudes of the comparative voltage VD1 and the reference voltage VREF. An output signal COMP1 indicating a comparison result is at the high level when VD1>VREF and is at the low level when VD1<VREF. In this embodiment, the comparative voltage VD1 and the reference voltage VREF coincide with each other when the voltage at the VDD terminal is V1. That is, the comparator 51 functions as a power supply determination circuit VDET1 that determines whether the voltage at the VDD terminal is higher or lower than the voltage V1.

The comparator 52 compares the magnitudes of the comparative voltage VD2 and the ground potential. An output signal COMP2 indicating a comparison result is at the high level when VD2>the ground potential and is at the low level when VD2<the ground potential. In this embodiment, the comparative voltage VD2 and the ground potential coincide with each other when the voltage at the VDD terminal is V2. That is, the comparator 52 functions as a power supply determination circuit VDET2 that determines whether the voltage at the VDD terminal is higher or lower than the voltage V2. In this embodiment, V1>V2.

The comparative-voltage generating circuit 70 is a circuit that generates two comparative voltages VB1 and VB2 from a voltage VB at the VBAT terminal. For example, the comparative-voltage generating circuit 70 divides resistance between the VBAT terminal and a terminal of the NMOS switch 72 at a predetermined resistance ratio and generates the comparative voltages VB1 and VB2.

The comparator 53 compares the magnitudes of the comparative voltage VB1 and the reference voltage VREF. An output signal COMP3 indicating a comparison result is at the high level when VB1>VREF and is at the low level when VB1<VREF. In this embodiment, the comparative voltage VB1 and the reference voltage VREF coincide with each other when the voltage at the VBAT terminal is V3. That is, the comparator 53 functions as a power supply determination circuit VDET3 that determines whether the voltage at the VBAT terminal is higher or lower than the voltage V3.

The comparator 54 compares the magnitudes of the comparative voltage VB2 and the reference voltage VREF. An output signal COMP4 indicating a comparison result is at the high level when VB2>VREF and is at the low level when VB2<VREF. In this embodiment, the comparative voltage VB2 and the reference voltage VREF coincide with each other when the voltage at the VBAT terminal is V4. That is, the comparator 54 functions as a power supply determination circuit VDET4 that determines whether the voltage at the VBAT terminal is higher or lower than the voltage V4.

The comparator 55 compares the magnitudes of the voltage VD at the VDD terminal and the voltage VB at the VBAT terminal. An output signal COMP5 indicating a comparison result is at the high level when VD>VB and is at the low level when VD<VB. That is, the comparator 55 functions as a power supply determination circuit VDET5 that determines whether the voltage at the VDD terminal is higher or lower than the voltage at the VBAT terminal.

The power-on reset circuit 40 follows a voltage rise at the VOUT terminal and generates a reset signal PORA until a voltage at the VOUT terminal reaches a desired voltage. The switch control circuit 20 is initialized according to the reset signal PORA.

The switch control circuit 20 (an example of a second control unit) performs opening and closing (ON/OFF) control of the switch circuits 31 to 33 (the switch elements SW1 to SW3) on the basis of input signals such as the output signals COMP1 to COMP5 of the comparators 51 to 55 (VDET1 to VDET5) and the output signal PDON of the latch circuit 12 and a setting value of an internal register (not shown in the figure) set from the outside via a not-shown interface circuit. In this switching control, the switch control circuit 20 also performs ON/OFF control of the operations of the comparators 51 to 55 (VDET1 to VDET5). Details of a processing procedure of the switch control by the switch control circuit 20 are explained below.

Further, when both the comparators 51 and 52 (VDET1 and VDET2) are off, the switch control circuit 20 supplies a low-level signal to the gate terminal of the NMOS switch 62 via the level shift circuit 64 and turns off the NMOS switch 62. Consequently, an electric current flowing from the VDD terminal to the ground via the comparative-voltage generating circuit 60 stops. Therefore, it is possible to reduce useless current consumption.

Similarly, when both the comparators 53 and 54 (VDET3 and VDET4) are off, the switch control circuit 20 supplies a low-level signal to the gate terminal of the NMOS switch 72 via the level shift circuit 74 and turns off the NMOS switch 72. Consequently, an electric current flowing from the VBAT terminal to the ground via the comparative-voltage generating circuit 70 stops. Therefore, it is possible to reduce a useless consumed current.

When the output signal PDON of the latch circuit 12 is at the high level (that is, when the switch circuit 33 (the switch element SW3) is fixed in the open state (the OFF state)), the gate terminal of the NMOS switch 72 is forcibly set to the low level by the NMOS switch 76 for pull down. Consequently, when the supply of the electric current and the voltage from the VBAT terminal to the VOUT terminal is interrupted, a useless consumed current flowing from the VBAT terminal to the ground via the comparative-voltage generating circuit 70 is reduced.

1-2. Processing Procedure of the Switch Control Circuit

FIGS. 2 to 7 are flowcharts for explaining an example of a processing procedure of switch control by the switch control circuit 20. The switching control circuit 20 realizes the flowcharts shown in FIGS. 2 to 7 according to, for example, a computer program stored in a memory (a storing unit) not shown in FIG. 1.

Figure 2:
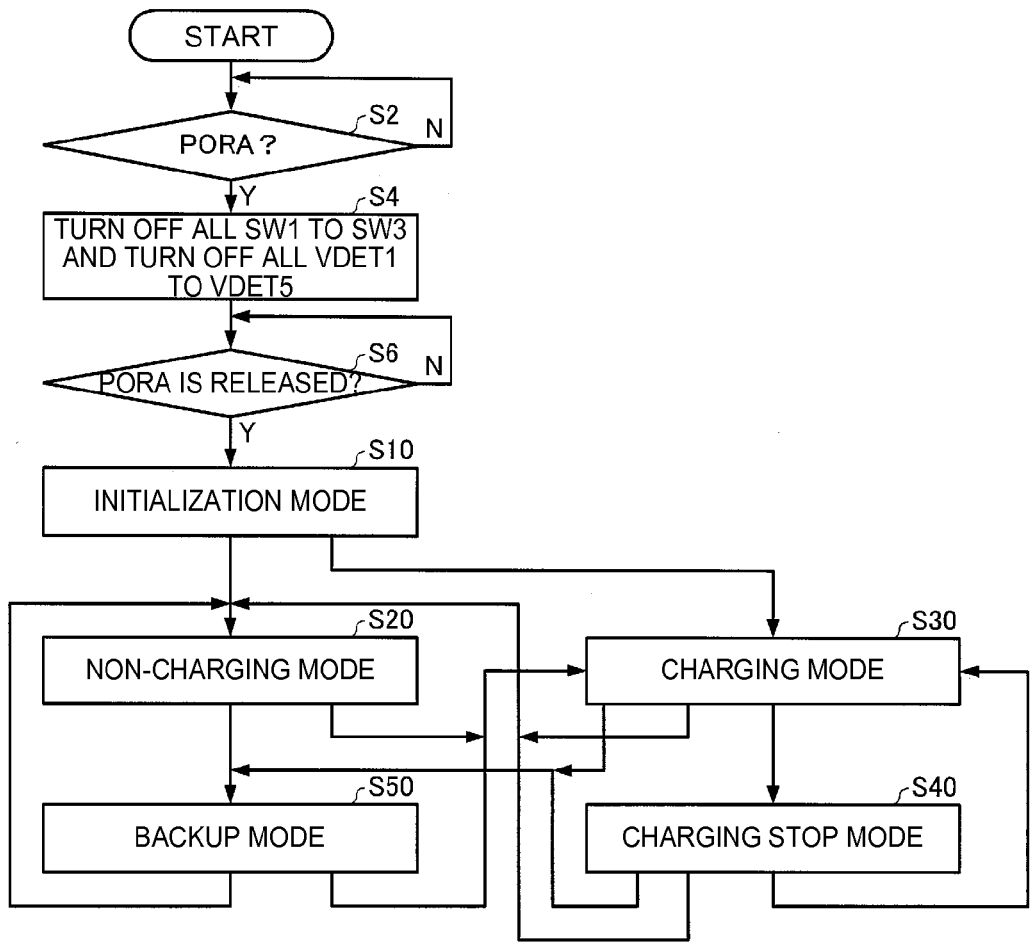
FIG. 2 is a flowchart for explaining an example of a processing procedure of switch control.

As shown in FIG. 2, first, when the reset signal PORA is input to the switch control circuit 20 (Y in S2), the switch control circuit 20 turns off all the switch elements SW1 to SW3 and turns off all the power supply determination circuits VDET1 to VDET5 (S4).

Thereafter, when the input of the reset signal PORA is released (Y in S6), the switch control circuit 20 shifts to processing in an initialization mode (S10).

After the processing in the initialization mode (S10), the switch control circuit 20 shifts to processing in a non-charging mode (S20) or a charging mode (S30) according to a setting value of the internal register.

During the processing in the non-charging mode (S20), the switch control circuit 20 shifts to processing in charging mode (S30) and a backup mode (S50) according to an input signal and a setting value of the internal register.

During the processing in the charging mode (S30), the switch control circuit 20 shifts to processing in the non-charging mode (S20), a charging stop mode (S40), or the backup mode (S50) according to an input signal and a setting value of the internal register.

During the processing in the charging stop mode (S40), the switch control circuit 20 shifts to processing in the non-charging mode (S20), the charging mode (S30), or the backup mode (S50) according to an input signal and a setting value of the internal register.

During the processing in the backup mode (S50), the switch control circuit 20 shifts to processing in the non-charging mode (S20) or the charging mode (S30) according to an input signal and a setting value of the internal register.

Figure 3:
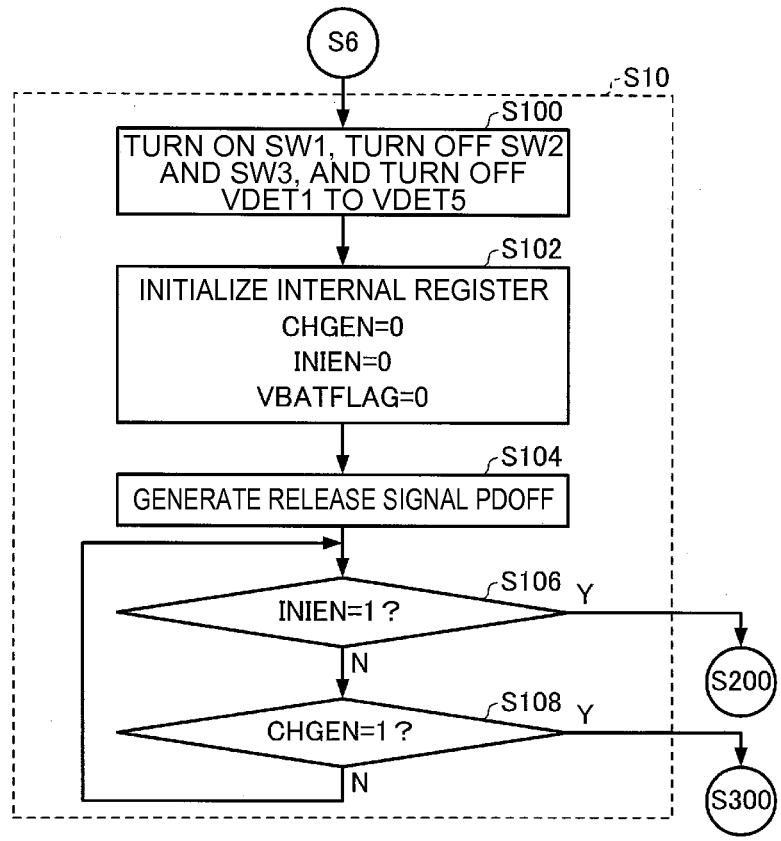
FIG. 3 is a flowchart for explaining the example of the processing procedure in an initialization mode.

FIG. 3 is a flowchart for explaining the example of the processing procedure in the initialization mode by the switch control circuit 20. As shown in FIG. 3, when the switch control circuit 20 shifts to the initialization mode, first, the switching circuit 20 turns on the switch element SW1, turns off the switch elements SW2 and SW3, and turns off all the power supply determination circuits VDET1 to VDET5 (S100).

Subsequently, the switch control circuit 20 initializes the internal register (S102). Consequently, all of a CHGEN bit, an INIEN bit, and a VBATFLAG bit are initialized to 0. The CHGEN bit is a bit for permitting charging of the backup power supply (when the CHGEN bit is 1, the charging is permitted). The INIEN bit is a bit for permitting shift from the initialization mode to the non-charging mode (when the INIEN bit is 1, the shift is permitted). The VBATFLAG bit is a bit for selecting the operation of which of the power supply determination circuit VDET3 and VDET4 is turned on in processing in the charging mode (FIG. 5) explained below. When the VBATFLAG bit is 1, the power supply determination circuit VDET3 is selected. When the VBATFLAG bit is 0, the power supply determination circuit VDET4 is selected.

The switch control circuit 20 generates the release signal PDOFF (S104). Consequently, even if the reset signal PORB is generated and the switch element SW3 is fixed in the OFF state before, since the fixing of the OFF state of the switch element SW3 is released, ON/OFF control of the switch element SW3 by the switch control circuit 20 is possible after the release.

The switch control circuit 20 waits until 1 is set in the INIEN bit or the CHGEN bit of the internal register. When 1 is set in the INIEN bit (Y in S106), the switch control circuit 20 shifts to the non-charging mode (S200 in FIG. 4). When 1 is set in the CHGEN bit (Y in S108), the switch control circuit 20 shifts to the charging mode (S300 in FIG. 5). For example, when the backup power supply connected to the VBAT terminal is a secondary battery or a capacitor, 1 is set in the CHGEN bit. For example, when the backup power supply is a primary battery, 1 is set in the INIEN bit.

Figure 4:
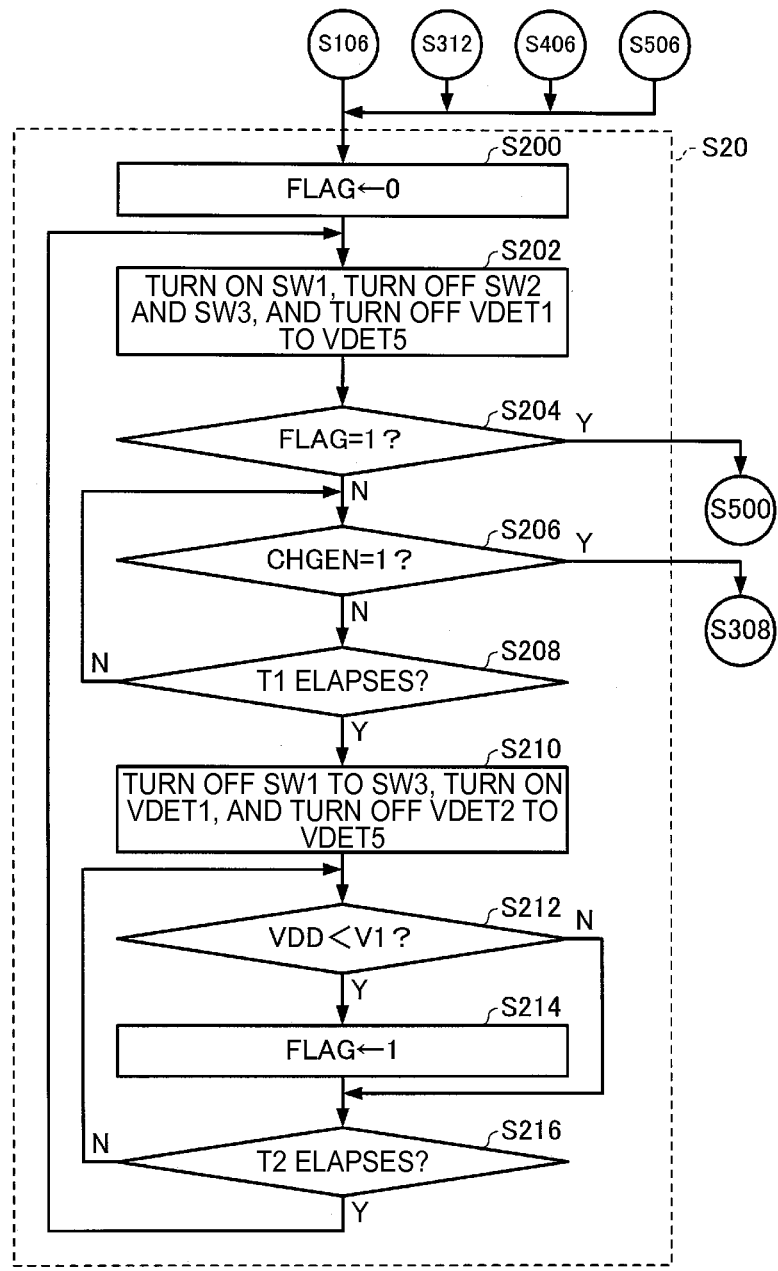
FIG. 4 is a flowchart for explaining the example of the processing procedure in a non-charging mode.

FIG. 4 is a flowchart for explaining the example of the processing procedure in the non-charging mode by the switch control circuit 20. As shown in FIG. 4, when the switch control circuit 20 shifts to the non-charging mode, first, the switch control circuit 20 initializes a FLAG bit on the inside to 0 (S200). The switch control circuit 20 turns on the switch element SW1, turns off the switch elements SW2 and SW3, and turns off all the power supply determination circuits VDET1 to VDET5 (S202).

Figure 5:
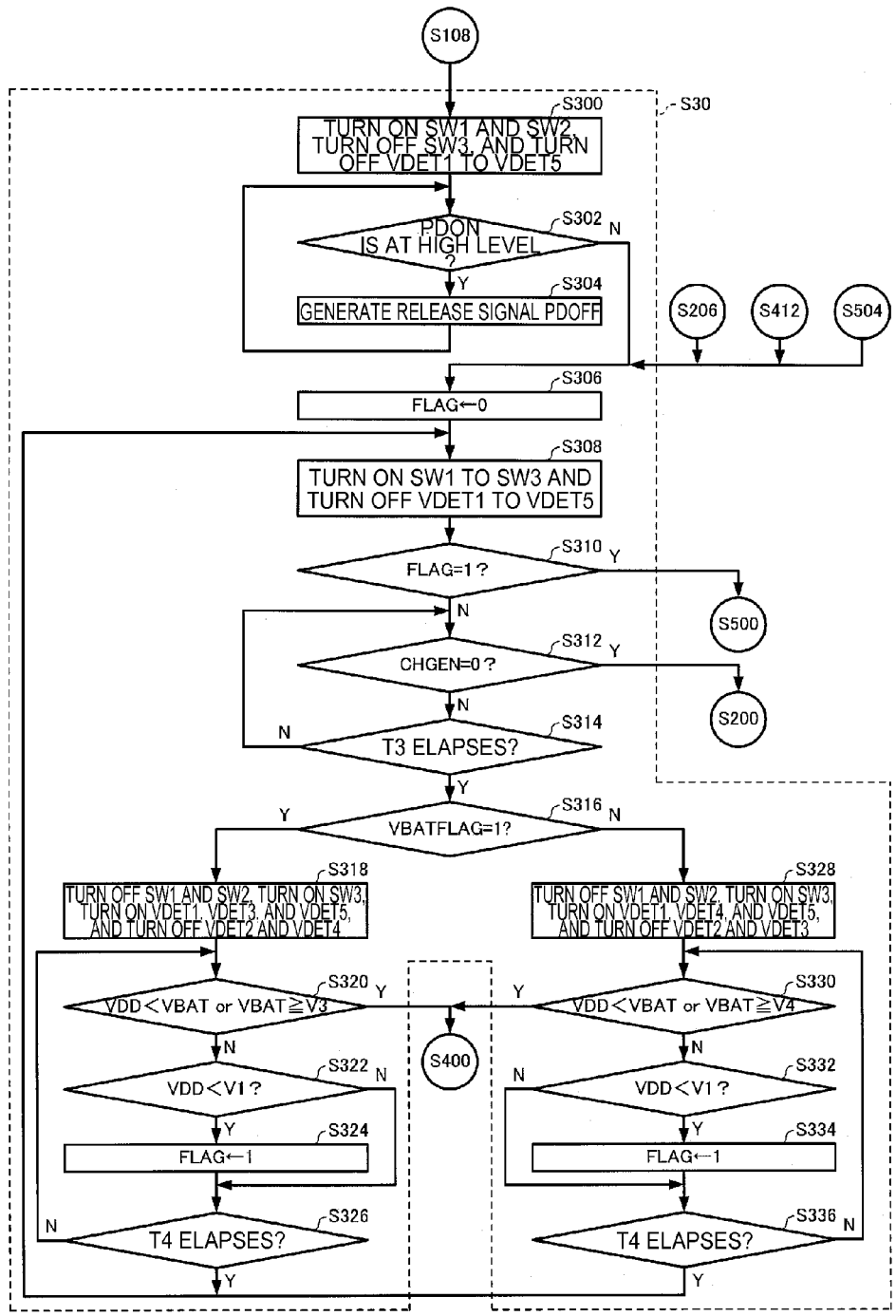
FIG. 5 is a flowchart for explaining the example of the processing procedure in a charging mode.

Since the FLAG bit is 0 (N in S204), when 1 is set in the CHGEN bit before a predetermined time T1 (e.g., 900 ms) elapses from a processing start of step S202 (Y in S206), the switch control circuit 20 shifts to the charging mode (S308 in FIG. 5).

On the other hand, when the predetermined time T1 elapses while the CHGEN bit is 0 (Y in S208), the switch control circuit 20 turns off the switch elements SW1 to SW3, turns on the power supply determination circuit VDET1, and turns off the power supply determination circuits VDET2 to VDET5 (S210).

The switch control circuit 20 monitors the output signal COMP1 of the power supply determination circuit VDET1 until a predetermined time T2 (e.g., 100 ms) elapses from a processing start of step S210. When the output signal COMP1 changes to the low level, that is, the voltage at the VDD terminal is lower than the voltage V1 (Y in S212), the switch control circuit 20 sets the FLAG bit to 1 (S214).

When the predetermined time T2 elapses (Y in S216), the switch control circuit 20 performs the processing in step S202 and subsequent steps again. When the FLAG bit is set to 1 by the processing in step S214 (Y in S204), the switch control circuit 20 shifts to the backup mode (S500 in FIG. 7).

In this way, in the non-charging mode, since the switch element SW2 is always turned off, a reverse bias is applied to the diode of the switch element SW2, a current path from the VDD terminal (the main power supply) to the VBAT terminal (the backup power supply) is interrupted, and charging of the backup power supply is not performed. Since the switch element SW3 is always turned off, a reverse bias is applied to the diode of the switch element SW3 and supply of a voltage from the VBAT terminal (the backup power supply) to the VOUT terminal is interrupted. Therefore, it is possible to suppress useless consumption of the backup power supply.

Turn-off of the operations of the power supply determination circuits VDET1 to VDET5 (turn-off of the NMOS switches 62 and 72 in a period of T1 and turn-on of only the operation of the power supply determination circuit VDET1 (turn-on of only the NMOS switch 62) in a period of T2 are repeated. Consequently, a voltage drop at the VDD terminal is intermittently monitored. In this way, in the non-charging mode, the NMOS switch 72 is always turned off and an electric current from the VBAT terminal to the ground is interrupted. Therefore, a useless consumed current is reduced and a voltage drop of the backup power supply is suppressed. In the T1 period in which the power supply determination circuit VDET1 and VDET2 do not operate, the NMOS switch 62 is turned off and an electric current from the VDD terminal to the ground is also interrupted. Therefore, a consumed current is reduced.

When the main power supply is interrupted, in the period of T1, the switch element SW1 is turned on and an electric current flows from the VOUT terminal to the VDD terminal. However, in the period of T2, the switch element SW1 is turned off. Therefore, a reverse bias is applied to the diode of the switch element SW1. The electric current flowing from the VOUT terminal into the VDD terminal is interrupted. That is, when the main power supply is interrupted, since the switch element SW1 intermittently repeats ON and OFF, the electric current flowing from the VOUT terminal into the VDD terminal and an electric current flowing out to the ground via an external load circuit connected to the VDD terminal are unbalanced. As a result, a voltage drop at the VDD terminal is promoted. The voltage drop at the VDD terminal is surely detected by the power supply determination circuit VDET1. It is possible to more quickly shift to the backup mode.

FIG. 5 is a flowchart for explaining the example of the processing procedure in the charging mode by the switch control circuit 20. As shown in FIG. 5, when the switch control circuit 20 shifts from the initialization mode to the charging mode, first, the switch control circuit 20 turns on the switch elements SW1 and SW2, turns off the switch element SW3, and turns off all the power supply determination circuits VDET1 to VDET5 (S300).

Subsequently, the switch control circuit 20 monitors the output signal PDON of the latch circuit 12 (S302). When the output signal PDON is at the high level (Y in S302), the switch control circuit 20 generates the release signal PDOFF (S304) and monitors the output signal PDON again (S302). That is, when the reset signal PORB is generated before, since the output signal PDON changes to the high level and the switch element SW3 is fixed in the OFF state, the switch control circuit 20 generates the release signal PDOFF and releases the fixing of the OFF state of the switch element SW3. Consequently, thereafter, it is possible to perform ON/OFF control of the switch element SW3 by the switch control circuit 20.

When the output signal PDON is at the low level (N in step S302), that is, when the output signal PDON is at the low level immediately after the shift to the charging mode or when the output signal PDON changes to the low level according to the processing in step S304, the switch control circuit 20 initializes the FLAG bit on the inside to 0 (S306), turns on the switch element SW1 to SW3, and turns off the power supply determination circuits VDET1 to VDET5 (S308).

Since the FLAG bit is 0 (N in S310), when 0 is set in the CHGEN bit before a predetermined time T3 (e.g., 900 ms) elapses from a processing start of step S308 (Y in S312), the switch control circuit 20 shifts to the non-charging mode (S200 in FIG. 4).

On the other hand, when the predetermined time T3 elapses while the CHGEN bit is 1 (Y in S314), when 1 is set in the VBATFLAG bit of the internal register (Y in S316), the switch control circuit 20 turns off the switch elements SW1 and SW2, turns on the switch element SW3, turns on the power supply determination circuits VDET1, VDET3, and VDET5, and turns off the power supply determination circuits VDET2 and VDET4 (S318).

The switch control circuit 20 monitors the output signals COMP1, COMP3, and COMP5 of the power supply determination circuits VDET1, VDET3, and VDET5 until a predetermined time T4 (e.g., 100 ms) elapses from a processing start of step S318. When the output signal COMP5 changes to the low level or the output signal COMP3 changes to the high level, that is, when the voltage at the VBAT terminal is higher than the voltage at the VDD terminal or the voltage at the VBAT terminal is higher than the voltage V3 (Y in S320), the switch control circuit 20 shifts to the charging stop mode (S400 in FIG. 6). When the output signal COMP1 changes to the low level, that is, the voltage at the VDD terminal is lower than the voltage V1 before the predetermined time T4 elapses (Y in S322), the switch control circuit 20 sets the FLAG bit to 1 (S324).

When the predetermined time T4 elapses (Y in S326), the switch control circuit 20 performs the processing in step S308 and subsequent steps again. When the FLAG bit is set to 1 according to the processing in step S324 (Y in S310), the switch control circuit 20 shifts to the backup mode (S500 in FIG. 7).

On the other hand, when 0 is set in the VBATFLAG bit of the internal register (N in S316), the switch control circuit 20 turns off the switch elements SW1 and SW2, turns on the switch element SW3, turns on the power supply determination circuits VDET1, VDET4, and VDET5, and turns off the power supply determination circuits VDET2 and VDET3 (S328).

The switch control circuit 20 monitors the output signals COMP1, COMP4, and COMP5 of the power supply determination circuits VDET1, VDET4, and VDET5 until the predetermined time T4 elapses from the processing start of step S318. When the output signal COMP5 changes to the low level or the output signal COMP4 changes to the high level, that is, when the voltage at the VBAT terminal is higher than the voltage at the VDD terminal or the voltage at the VBAT terminal is higher than the voltage V4 (Y in S330), the switch control circuit 20 shifts to the charging stop mode (S400 in FIG. 6). When the output signal COMP1 changes to the low level, that is, the voltage at the VDD terminal is lower than the voltage V1 before the predetermined time T4 elapses (Y in S332), the switch control circuit 20 sets the FLAG bit to 1 (S334).

When the predetermined time T4 elapses (Y in S336), the switch control circuit 20 performs the processing in step S308 and subsequent steps again. When the FLAG bit is set to 1 according to the processing in step S324 (Y in S310), the switch control circuit 20 shifts to the backup mode (S500 in FIG. 7).

When the switch control circuit 20 shifts from the non-charging mode, the charging stop mode, or the backup mode to the charging mode, the switch control circuit 20 starts the processing at step S306.

In this way, in the charging mode, first, when the switch elements SW1 and SW2 are turned on and the switch element SW3 is turned off, an electric current flows from the VDD terminal (the main power supply) to the VBAT terminal (the backup power supply) via channels of the switch elements SW1 and SW2 and the diode of the switch element SW3. The backup power supply is slowly charged (pre-charged). Thereafter (when the switch element SW3 is fixed in the OFF state, after the fixing of the OFF state of the switch element SW3 is released), when the switch element SW3 is turned on in a period of T3, charging of the backup power supply is efficiently performed via channels of the switch elements SW1 to SW3.

Turn-off of all the operations of the power supply determination circuits VDET1 to VDET5 (turn-off of the NMOS switches 62 and 72) in the period of T3 and turn-on of the operations of the power supply determination circuits VDET1, VDET3, and VDET5 or the power supply determination circuits VDET1, VDET4, and VDET5 (turn-on of the NMOS switches 62 and 72) in a period of T4 are repeated. Consequently, a voltage rise at the VBAT terminal and a voltage drop at the VDD terminal are intermittently monitored. In this way, in the charging mode, in the T3 period in which the operations of the power supply determination circuits VDET1 to VDET5 are turned off, both the NMOS switches 62 and 72 are turned off and electric currents from the VDD terminal and the VBAT terminal to the ground are interrupted. Therefore, a useless consumed current is reduced and deterioration in charging efficiency is suppressed.

When the main power supply is interrupted, in the period of T3, the switch elements SW1 and SW2 are turned on and an electric current flows from the VOUT terminal or the VBAT terminal to the VDD terminal. However, in the period of T4, the switch element SW1 is turned off. Therefore, a reverse bias is applied to the diode of the switch element SW1. The electric current flowing from the VOUT terminal or the VBAT terminal into the VDD terminal is interrupted. That is, when the main power supply is interrupted, since the switch element SW1 intermittently repeats ON and OFF, the electric current flowing from the VOUT terminal or the VBAT terminal into the VDD terminal and the electric current flowing out to the ground via the external load circuit connected to the VDD terminal are unbalanced. As a result, a voltage drop at the VDD terminal is promoted. The voltage drop at the VDD terminal is surely detected by the power supply determination circuit VDET1. It is possible to more quickly shift to the backup mode.

Figure 6:
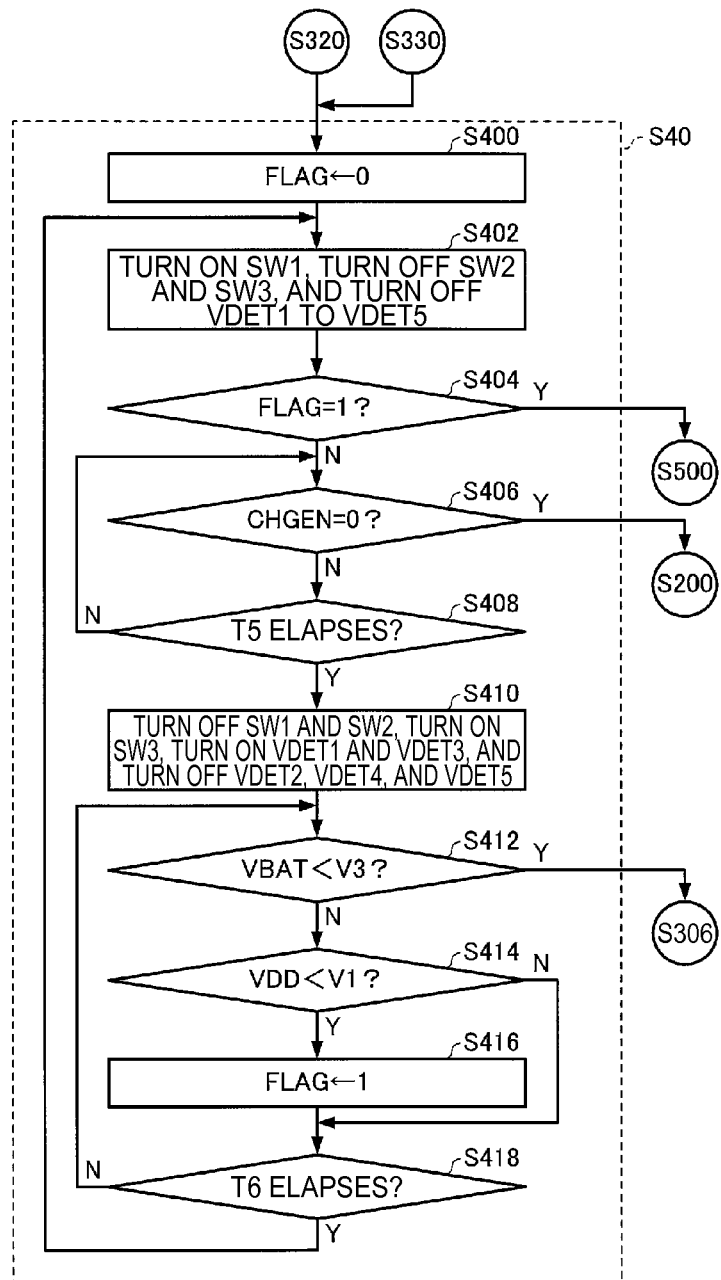
FIG. 6 is a flowchart for explaining the example of the processing procedure in a charging stop mode.

FIG. 6 is a flowchart for explaining the example of the processing procedure in the charging stop mode by the switch control circuit 20. As shown in FIG. 6, when the switch control circuit 20 shifts to the charging stop mode, first, the switch control circuit 20 initializes the FLAG bit on the inside to 0 (S400). Further, the switch control circuit 20 turns on the switch element SW1, turns off the switch elements SW2 and SW3, and turns off all the power supply determination circuits VDET1 to VDET5 (S402).

Since the FLAG bit is 0 (N in S404), when 0 is set in the CHGEN bit before a predetermined time T5 (e.g., 900 ms) elapses from a processing start of step S402 (Y in S406), the switch control circuit 20 shifts to the non-charging mode (S200 in FIG. 4).

On the other hand, when the predetermined time T5 elapses while the CHGEN bit is 1 (Y in S408), the switch control circuit 20 turns off the switch elements SW1 and SW2, turns on the switch element SW3, turns on the power supply determination circuits VDET1 and VDET3, and turns off the power supply determination circuits VDET2, VDET4, and VDET5 (S410).

The switch control circuit 20 monitors the output signals COMP1 and COMP3 of the power supply determination circuits VDET1 and VDET3 until a predetermined time T6 (e.g., 100 ms) elapses from a processing start of step S410. When the output signal COMP3 changes to the low level, that is, the voltage at the VBAT terminal is lower than the voltage V3 (Y in S412), the switch control circuit 20 shifts to the charging mode (S306 in FIG. 5). When the output signal COMP1 changes to the low level, that is, the voltage at the VDD terminal is lower than the voltage V1 before the predetermined time T6 elapses (Y in S414), the switch control circuit 20 sets the FLAG bit to 1 (S416).

When the predetermined time T6 elapses (Y in S418), the switch control circuit 20 performs the processing in step S402 and subsequent steps again. When the FLAG bit is set to 1 by the processing in step S416 (Y in S404), the switch control circuit 20 shifts to the backup mode (S500 in FIG. 7).

In this way, in the charging stop mode, since the switch element SW2 is always turned off, a reverse bias is applied to the diode of the switch element SW2, the current path from the VDD terminal (the main power supply) to the VBAT terminal (the backup power supply) is interrupted, and charging of the backup power supply is not performed. Therefore, it is possible to prevent overcharging of the backup power supply.

Turn-off of all the operations of the power supply determination circuits VDET1 to VDET5 (turn-off of the NMOS switches 62 and 72) in a period of T5 and turn-on of the operations of the power supply determination circuits VDET1 and VDET3 (turn-on of the NMOS switches 62 and 72) in a period of T6 are repeated. Consequently, a voltage drop at the VBAT terminal and a voltage drop at the VDD terminal are intermittently monitored. In this way, in the charging stop mode, both the NMOS switches 62 and 72 are turned off and the electric currents from the VDD terminal and the VBAT terminal to the ground are interrupted in the period T5 during which the operations of the power supply determination circuits VDET1 to VDET5 are turned off. Therefore, a useless consumed current is reduced and deterioration in charging efficiency is suppressed.

When the main power supply is interrupted, in the period of T5, the switch element SW1 is turned on and an electric current flows from the VOUT terminal to the VDD terminal. However, in the period of T6, the switch element SW1 is turned off. Therefore, a reverse bias is applied to the diode of the switch element SW1. The electric current flowing from the VOUT terminal into the VDD terminal is interrupted. That is, when the main power supply is interrupted, since the switch element SW1 intermittently repeats ON and OFF, the electric current flowing from the VOUT terminal into the VDD terminal and the electric current flowing out to the ground via the external load circuit connected to the VDD terminal are unbalanced. As a result, a voltage drop at the VDD terminal is promoted. The voltage drop at the VDD terminal is surely detected by the power supply determination circuit VDET1. It is possible to more quickly shift to the backup mode.

Figure 7:
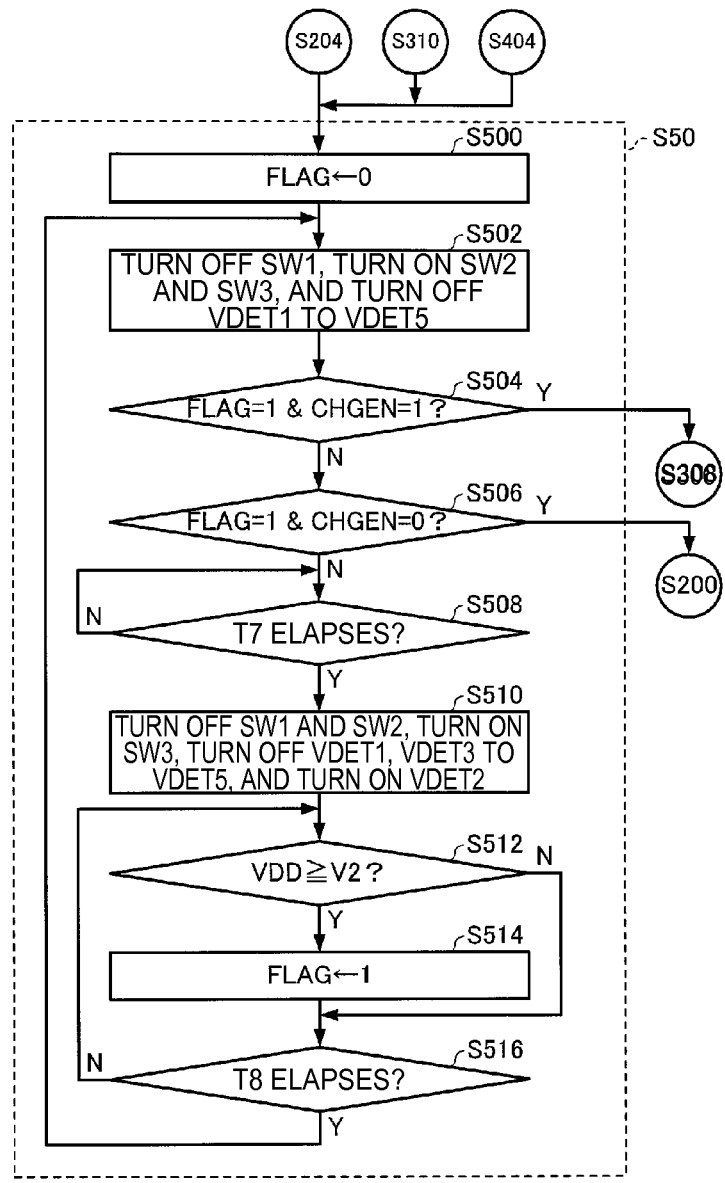
FIG. 7 is a flowchart for explaining the example of the processing procedure in a backup mode.

FIG. 7 is a flowchart for explaining the example of the processing procedure in the backup mode by the switch control circuit 20. As shown in FIG. 7, when the switch control circuit 20 shifts to the backup mode, first, the switch control circuit 20 initializes the FLAG bit on the inside to 0 (S500). Further, the switch control circuit 20 turns off the switch element SW1, turns on the switch elements SW2 and SW3, and turns off all the power supply determination circuits VDET1 to VDET5 (S502).

Since the FLAG bit is 0 (N in S504), when a predetermined time T7 (e.g., 900 ms) elapses from a processing start of step S502 (Y in S508), the switch control circuit 20 turns off the switch elements SW1 and SW2, turns on the switch element SW3, turns off the power supply determination circuits VDET1 and VDET3 to VDET5, and turns on the power supply determination circuit VDET2 (S510).

The switch control circuit 20 monitors the output signal COMP2 of the power supply determination circuit VDET2 until a predetermined time T8 (e.g., 100 ms) elapses from a processing start of step S510. When the output signal COMP2 changes to the high level, that is, the voltage at the VDD terminal is higher than the voltage V2 (Y in S512), the switch control circuit 20 sets the FLAG bit to 1 (S514).

When the predetermined time T8 elapses (Y in S516), the switch control circuit 20 performs the processing in step S502 and subsequent steps again. When the FLAG bit is set to 1 by the processing in step S514, when the CHGEN bit is set to 1 (Y in S504), the switch control circuit 20 shifts to the charging mode (S306 in FIG. 5). When the CHGEN bit is set to 0 (Y in S506), the switch control circuit 20 shifts to the non-charging mode (S200 in FIG. 4).

In this way, in the backup mode, since the switch element SW3 is always turned on, a voltage is supplied from the VBAT terminal (the backup power supply) to the VOUT terminal. Therefore, the functional circuits connected to the VOUT terminal can continue operations.

Since the switch element SW1 is always turned off, a reverse bias is applied to the diode of the switch element SW1 and the electric current flowing from the VOUT terminal or the VBAT terminal into the VDD terminal is interrupted. Consequently, in a state in which the main power supply is interrupted, it is possible to suppress useless consumption of the backup power supply and prevent a situation in which a voltage rise at the VDD terminal is detected by the power supply determination circuit VDET2 and the switch control circuit 20 exits the backup mode.

Turn-off of all the operations of the power supply determination circuits VDET1 to VDET5 (turn-off of the NMOS switches 62 and 72) in a period of T7 and turn-on of only the operation of the power supply determination circuit VDET2 (turn-on of only the NMOS switch 62) in a period of T8 are repeated. Consequently, a voltage drop at the VDD terminal is intermittently monitored. In this way, in the backup mode, the NMOS switch 72 is always turned off and the electric current from the VBAT terminal to the ground is interrupted. Therefore, a useless consumed current is reduced and a voltage drop of the backup power supply is suppressed. In the T7 period in which the power supply determination circuits VDET1 and VDET2 do not operate, the NMOS switch 62 is turned off and the electric current from the VDD terminal to the ground is interrupted. Therefore, a consumed current is reduced.

In the flowcharts of FIGS. 4 to 7, the predetermined times T1 to T8 may be variably set. For example, setting values of the predetermined times T1 to T8 may be stored in a nonvolatile memory not shown in FIG. 1. The switch control circuit 20 may read out the setting values from the nonvolatile memory and measure the predetermined times T1 to T8.

1-3. Manufacturing Method for the Voltage Output Circuit

Figure 8:
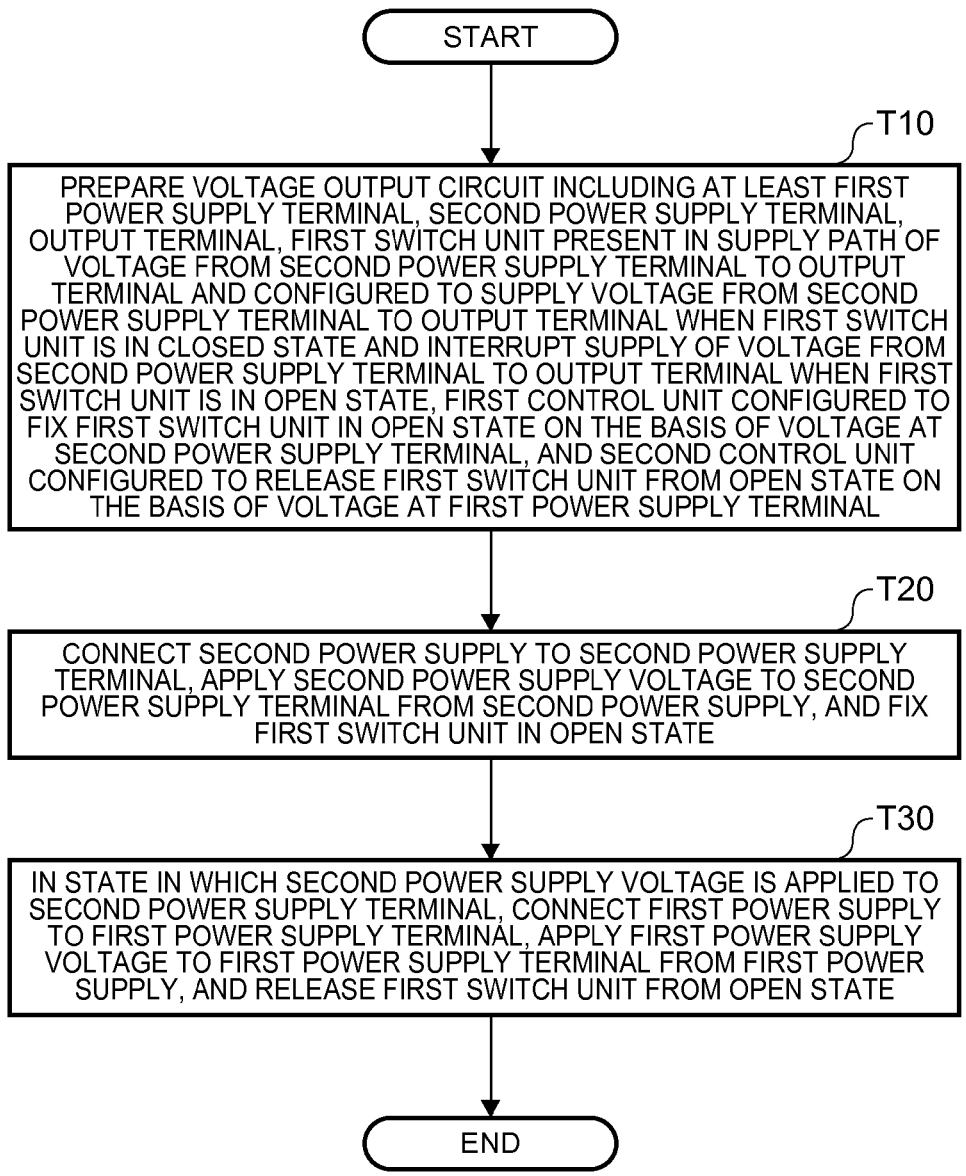
FIG. 8 is a flowchart for explaining an example of a manufacturing method for the voltage output circuit in the embodiment.

FIG. 8 is a flowchart for explaining an example of a manufacturing method for a voltage output circuit in this embodiment.

As shown in FIG. 8, in this embodiment, first, a voltage output circuit is prepared that includes at least a first power supply terminal (the VDD terminal shown in FIG. 1), a second power supply terminal (the VBAT terminal shown in FIG. 1), an output terminal (the VOUT terminal shown in FIG. 1), a first switch unit (the switch circuit 33 shown in FIG. 1) present in a supply path of a voltage from the second power supply terminal to the output terminal and configured to supply the voltage from the second power supply terminal to the output terminal when the first switch unit is in the closed state (the ON state) and interrupt the supply of the voltage from the second power supply terminal to the output terminal when the first switch unit is in the open state (the OFF state), a first control unit (the switch control circuit 10 shown in FIG. 1) configured to fix the first switch unit in the open state (the OFF state) on the basis of the voltage at the second power supply terminal, and a second control unit (the switch control circuit 20 shown in FIG. 1) configured to release the fixing of the open state of the first switch unit (the OFF state) on the basis of the voltage at the first power supply terminal (T10). For example, such a voltage output circuit may be created as one integrated circuit (IC) chip or may be created by wiring a plurality of IC chips. Alternatively, a part or all of the voltage output circuit may be created by wiring discrete components.

Subsequently, a second power supply (the backup power supply) is connected to the second power supply terminal, a second power supply voltage (the voltage of the backup power supply) is applied to the second power supply terminal from the second power supply, and the first switch unit is fixed in the open state (T20).

In a state in which the second power supply voltage is applied to the second power supply terminal, a first power supply (the main power supply) is connected to the first power supply terminal, a first power supply voltage (the voltage of the main power supply) is applied from the first power supply, and the fixing of the open state of the first switch unit is released (T30).

Figure 9:
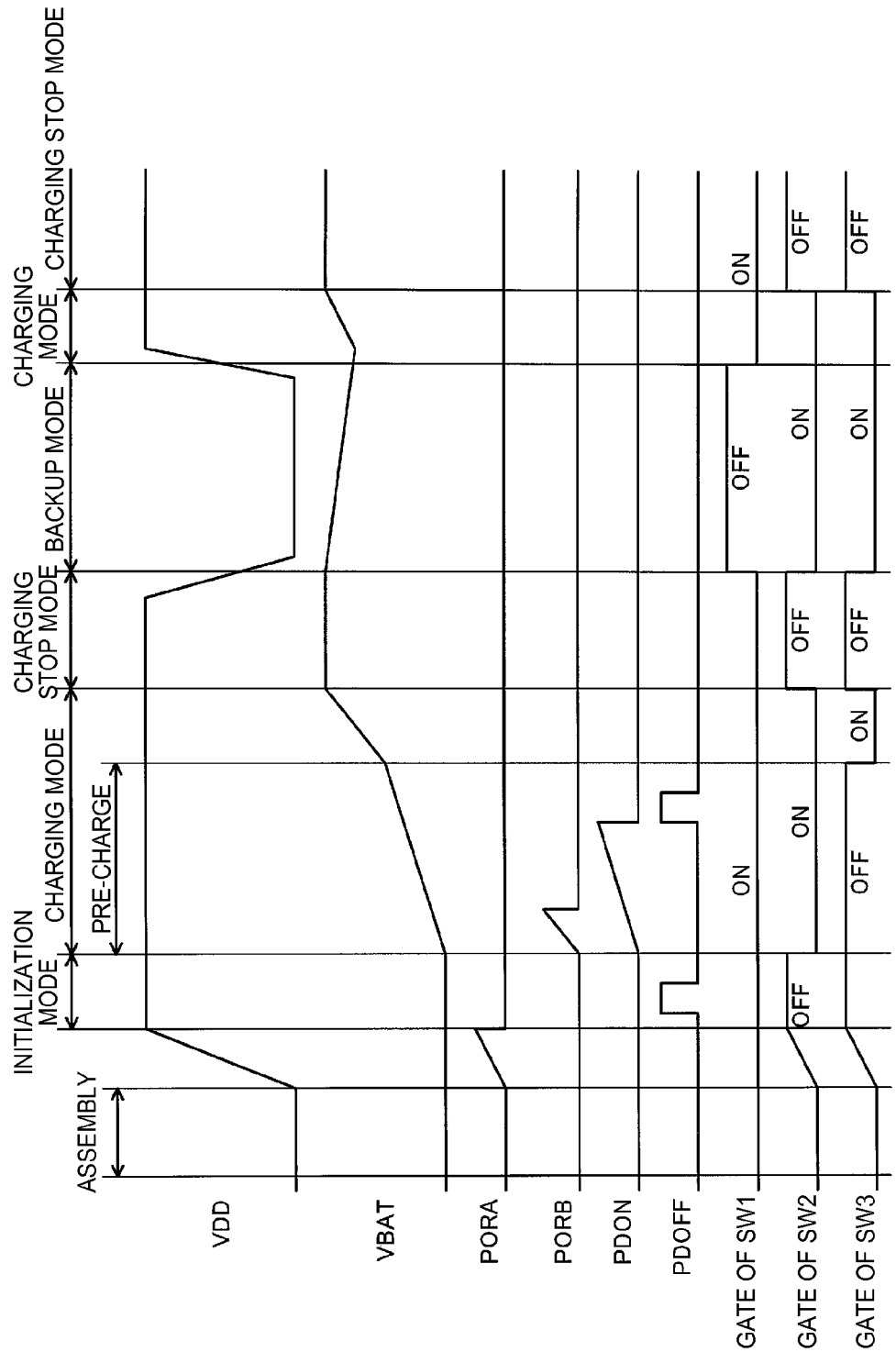
FIG. 9 is a diagram for explaining an example of a timing chart of the operation of the voltage output circuit in the embodiment.

FIG. 9 is a diagram of an example of a timing chart of the operation of the voltage output circuit 1 in this embodiment shown in FIG. 1. In the example, in the manufacturing method shown in FIG. 8, after the backup power supply, which is rechargeable and not charged yet, is connected to the VBAT terminal, the main power supply is connected to the VDD terminal.

In the example shown in FIG. 9, first, an assembly process for connecting the backup power supply and the main power supply to the voltage output circuit 1 is performed. In the assembly process, before the main power supply is connected to the VDD terminal, the backup power supply is connected to the VBAT terminal. However, since the backup power supply is not charged yet, the voltage at the VBAT terminal does not rise.

Thereafter, after the main power supply is connected to the VDD terminal and the voltage at the VDD terminal rises, the voltage output circuit 1 shifts from the initialization mode to the charging mode and pre-charge of the backup power supply is started. According to the pre-charge, the voltage at the VBAT terminal rises, the reset signal PORB is generated, and the switch element SW3 is fixed in the OFF state. When the switch element SW3 is fixed in the OFF state, a supply path of an electric current and a voltage from the VBAT terminal to the VOUT terminal is interrupted. Useless consumption of the backup power supply is suppressed.

Thereafter, after the fixing of the OFF state of the switch element SW3 is released according to the release signal PDOFF, the switch element SW3 is turned on, the backup power supply is charged, the backup power supply is fully charged, and the voltage output circuit 1 shifts to the charging stop mode.

Since the main power supply is interrupted in the charging stop mode, the voltage at the VDD terminal drops and the voltage output circuit 1 shifts to the backup mode. Thereafter, since the main power supply is recovered, the voltage at the VDD terminal rises, the voltage output circuit 1 shifts from the backup mode to the charging mode, the backup power supply is fully charged, and the voltage output circuit 1 shifts to the charging stop mode again.

Figure 10:
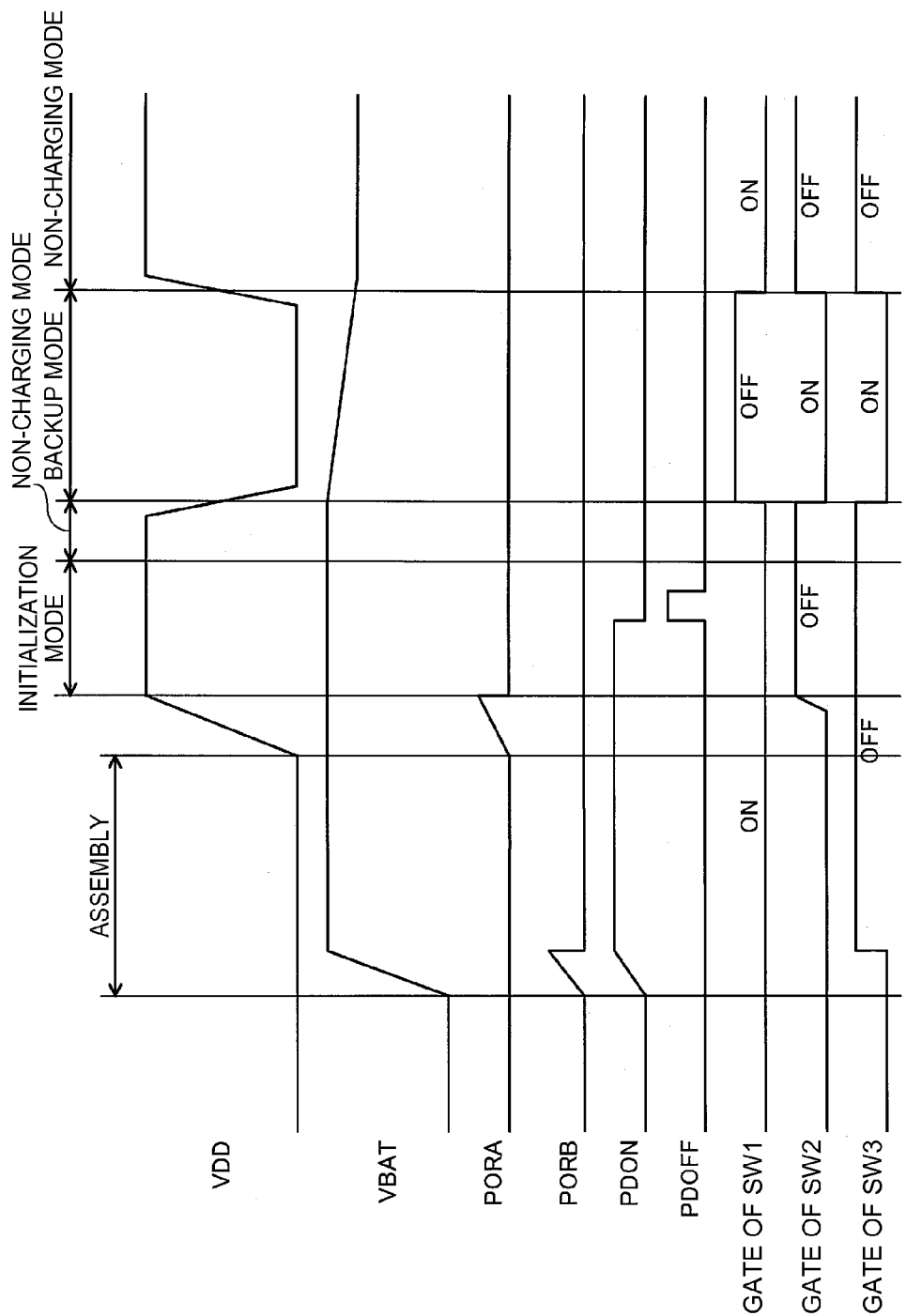
FIG. 10 is a diagram for explaining another example of the timing chart of the operation of the voltage output circuit in the embodiment.

FIG. 10 is a diagram for explaining an example of a timing chart of the operation of the voltage output circuit 1 in this embodiment shown in FIG. 1. In the example, in the manufacturing method shown in FIG. 8, after an un-rechargeable backup power supply (a primary battery, etc.) is connected to the VBAT terminal, the main power supply is connected to the VDD terminal.

In the example shown in FIG. 10, as in the example shown in FIG. 9, first, an assembly process for connecting the backup power supply and the main power supply to the voltage output circuit 1 is performed. In the assembly process, before the main power supply is connected to the VDD terminal, the backup power supply is connected to the VBAT terminal and the voltage at the VBAT terminal rises. According to the voltage rise at the VBAT terminal, the reset signal PORB is generated and the switch element SW3 is fixed in the OFF state. Since the switch element SW3 is fixed in the OFF state, the supply path of an electric current and a voltage from the VBAT terminal to the VOUT terminal is interrupted. Useless consumption of the backup power supply is suppressed.

Thereafter, after the main power supply is connected to the VDD terminal and the voltage at the VDD terminal rises, the voltage output circuit 1 shifts to the initialization mode. After the fixing of the OFF state of the switch element SW3 is released according to the release signal PDOFF, the voltage output circuit 1 shifts to the non-charging mode.

Since the main power supply is interrupted in the non-charging mode, the voltage at the VDD terminal drops and the voltage output circuit 1 shifts to the backup mode. Thereafter, since the main power supply is recovered, the voltage at the VDD terminal rises and the voltage output circuit 1 shifts from the backup mode to the non-charging mode.

As explained above, with the voltage output circuit in this embodiment, the switch element SW3 is off until the voltage output circuit shifts to the charging mode. Therefore, a reverse bias is applied to the diode of the switch element SW3. The current and voltage path from the VBAT terminal to the VOUT terminal is interrupted. Therefore, even if the backup power supply is connected to the VBAT terminal before the main power supply is connected to the VDD terminal, it is possible to suppress useless consumption of electric power of the backup power supply.

With the voltage output circuit in this embodiment, after the initialization mode ends, as long as a desired power supply voltage is supplied from the main power supply to the VDD terminal, the voltage output circuit is in any one of the non-charging mode, the charging mode, and the charging stop mode. A voltage is always supplied from the VDD terminal to the VOUT terminal via the channel of the switch element SW1 when the switch element SW1 is on and via the diode of the switch element SW1 when the switch element SW1 is off. Therefore, as long as the desired power supply voltage is supplied from the main power supply to the VDD terminal, the functional circuits connected to the VOUT terminal can continue operations with the power supply voltage supplied from the main power supply. On the other hand, when the desired power supply voltage is not supplied from the main power supply to the VDD terminal, the voltage output circuit in this embodiment shifts to the backup mode. In the backup mode, the switch element 3 is always turned on. Therefore, a voltage is always supplied from the VBAT terminal to the VOUT terminal via the channel of the switch element SW2 and the channel of the switch element SW3 when the switch element SW2 is on and via the diode of the switch element SW2 and the channel of the switch element SW3 when the switch element SW2 is off. Therefore, even if the desired power supply voltage is not supplied from the main power supply to the VDD terminal, the functional circuits connected to the VOUT terminal can continue the operations with a power supply voltage supplied from the backup power supply.

With the voltage output circuit in this embodiment, the switch element SW1 is intermittently turned on and off in the non-charging mode, the charging mode, and the charging stop mode. Therefore, an electric current flowing into the VDD terminal and an electric current flowing out from the VDD terminal are unbalanced. A voltage drop at the VDD terminal is promoted. The voltage drop at the VDD terminal is surely detected by the power supply determination circuit VDET1. It is possible to more quickly shift to the backup mode.

With the voltage output circuit in this embodiment, when the main power supply in interrupted during charging of the backup power supply, at a point when the voltage at the VBAT terminal is higher than the voltage at the VDD terminal, even if the backup power supply is not fully charged, the voltage output circuit immediately shifts to the backup mode. Therefore, it is possible to suppress a backflow of an electric current from the backup power supply. It is possible to efficiently perform switching from the main power supply to the backup power supply without waste.

With the voltage output circuit in this embodiment, in the non-charging mode, the charging mode, the charging stop mode, and the backup mode, it is possible to reduce an electric current consumed by the power supply determination circuits VDET1 to VDET5 by always turning off the power supply determination circuit that do not need to operate among the power supply determination circuits VDET1 to VDET5 and intermittently turning on the power supply determination circuits that are caused to operate. Further, it is possible to reduce an electric current consumed by the comparative-voltage generation circuits 60 and 70 by turning off the NMOS switches 62 and 72 as much as possible. To reduce the electric currents consumed by the power supply determination circuits VDET1 to VDET5 and the comparative-voltage generation circuits 60 and 70, the predetermined times T2, T4, T6, and T8 in the flowcharts of FIGS. 4 to 7 are desirably as short as possible. However, to promote a voltage drop at the VDD terminal when the main power supply is interrupted, it is necessary to increase the predetermined times T2, T4, and T6, which are equivalent to the periods when the switch element SW1 is intermittently turned off, to some extent. Therefore, it is desirable to adjust the predetermined times T1 to T8 to optimum times according to the configuration of a system in which the voltage output circuit in this embodiment is used.

With the voltage output circuit in this embodiment, compared with charging methods such as trickle charging and pulse charging, it is possible to reduce a risk of damage to the backup power supply due to charging.

2. Electronic Apparatus

Figure 11:
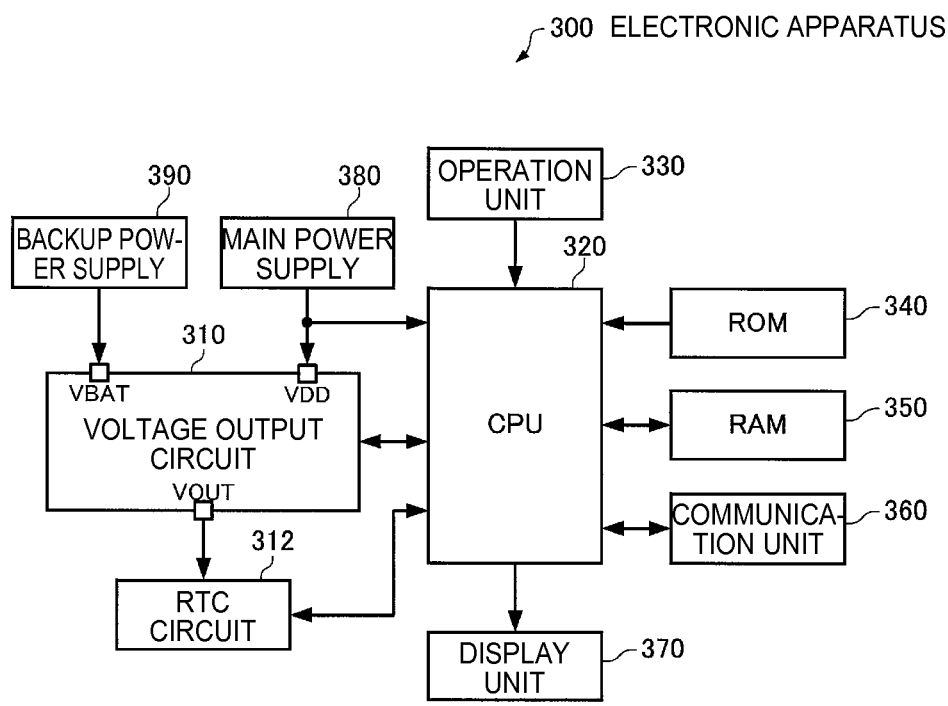
FIG. 11 is a functional block diagram of an electronic apparatus in the embodiment.
Figure 12:
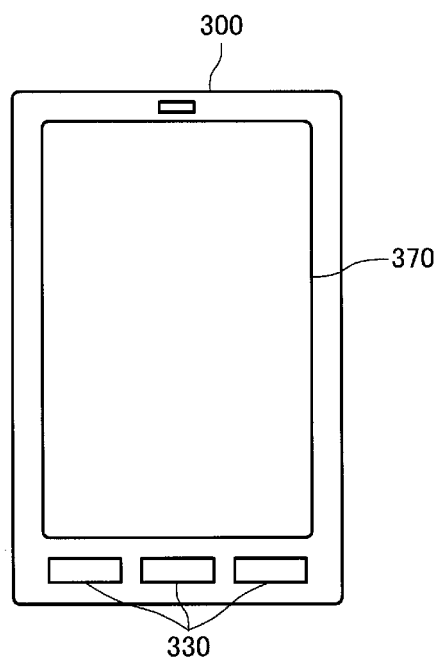
FIG. 12 is a diagram showing an example of the external appearance of the electronic apparatus in the embodiment.

FIG. 11 is a functional block diagram of an electronic apparatus in this embodiment. FIG. 12 is a diagram of an example of the external appearance of a smart phone, which is an example of the electronic apparatus in this embodiment.

An electronic apparatus 300 in this embodiment includes a voltage output circuit 310, a real-time clock (RTC) circuit 312, a CPU (Central Processing Unit) 320, an operation unit 330, a ROM (Read Only Memory) 340, a RAM (Random Access Memory) 350, a communication unit 360, a display unit 370, a main power supply 380, and a backup power supply 390. In the electronic apparatus in this embodiment, a part of the components (units) shown in FIG. 11 may be omitted or changed or other components may be added.

The main power supply 380 supplies a power supply voltage to a VDD terminal of the voltage output circuit 310. The main power supply 380 supplies the power supply voltage to the CPU 320 as well.

The backup power supply 390 supplies a power supply voltage to a VBAT terminal of the voltage output circuit 310.

When a voltage at the VDD terminal is higher than a predetermined voltage value, the voltage output circuit 310 outputs the voltage at the VDD terminal to a VOUT terminal. When the voltage at the VDD terminal is lower than the predetermined voltage value, the voltage output circuit 310 shifts to a backup mode and outputs a voltage at the VBAT terminal to the VOUT terminal. The voltage output circuit 310 is configured to interrupt a supply path of a voltage from the VBAT terminal to the VOUT terminal when a voltage is supplied to the VBAT terminal. As the voltage output circuit 310, for example, the voltage output circuit 1 in this embodiment can be applied.

The real-time clock (RTC) circuit 312 is a circuit that generates time information (information concerning year, month, day, hour, minute, second, and the like). The CPU 320 is capable of reading out the time information from the RTC circuit 312. The RTC circuit 312 performs a clocking operation with the power supply voltage supplied from the VOUT terminal of the voltage output circuit 310.

The CPU 320 performs various kinds of calculation processing and control processing according to computer programs stored in the ROM 340 and the like. Specifically, the CPU 320 performs, for example, various kinds of setting processing for the voltage output circuit 310, processing for reading out the time information from the RTC circuit 312, various kinds of processing corresponding to operation signals from the operation unit 330, processing for controlling the communication unit 360 to perform data communication with the outside, and processing for transmitting display signals to cause the display unit 370 to display various kinds of information (the time information read out from the RTC circuit 312, etc.).

The operation unit 330 is an input device including operation keys and button switches. The operation unit 330 outputs an operation signal corresponding to operation by a user to the CPU 320.

The ROM 340 has stored therein computer programs, data, and the like for the CPU 320 to perform the various kinds of calculation processing and control processing.

The RAM 350 is used as a work area of the CPU 320 and temporarily stores the programs and the data read out from the ROM 340, data input from the operation unit 330, a result of an operation executed by the CPU 320 according to various computer programs, and the like.

The communication unit 360 performs various kinds of control for establishing data communication between the CPU 320 and an external apparatus.

The display unit 370 is a display device including an LCD (Liquid Crystal Display) and displays various kinds of information on the basis of display signals input from the CPU 320. In the display unit 370, a touch panel functioning as the operation unit 330 is provided.

It is possible to realize an electronic apparatus having high reliability by incorporating the voltage output circuit 1 in this embodiment as the voltage output circuit 310.

Figure 13:
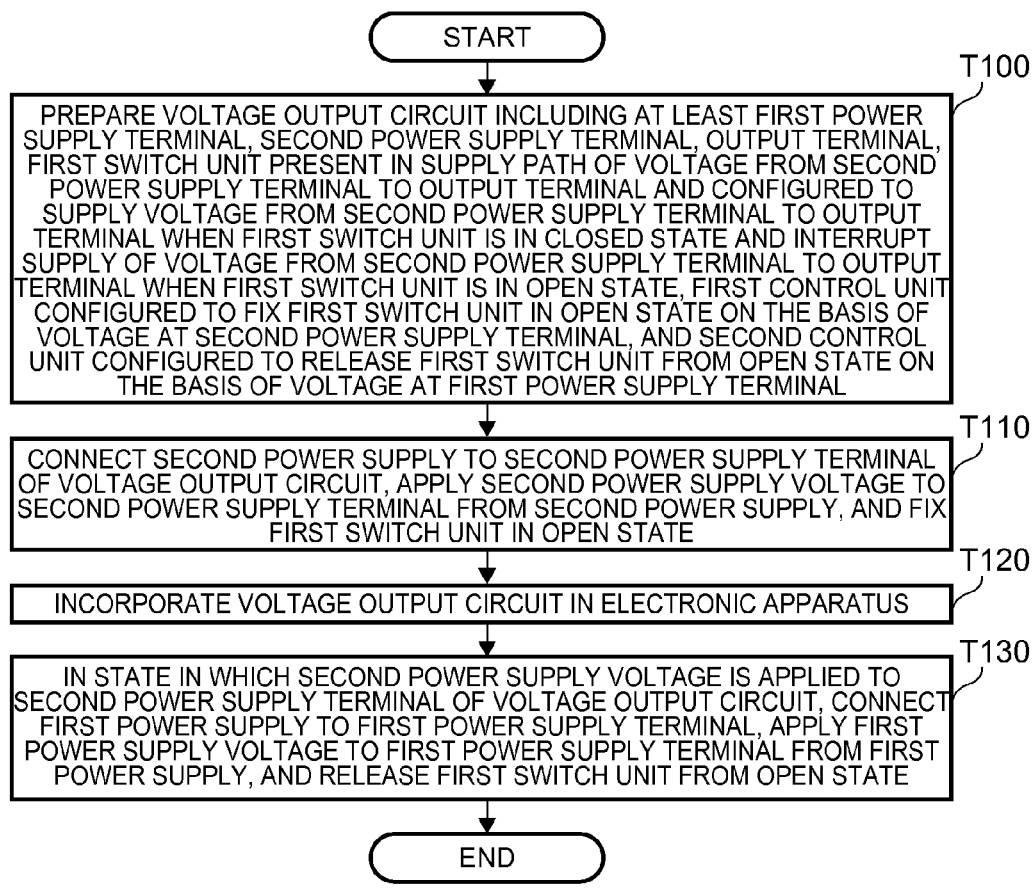
FIG. 13 is a flowchart for explaining an example of a manufacturing method for the electronic apparatus in the embodiment.

FIG. 13 is a flowchart for explaining an example of a manufacturing method for the electronic apparatus in this embodiment.

As shown in FIG. 13, in this embodiment, first, the voltage output circuit 310 is prepared that includes at least a first power supply terminal (the VDD terminal shown in FIG. 11), a second power supply terminal (the VBAT terminal shown in FIG. 11), an output terminal (the VOUT terminal shown in FIG. 11), a first switch unit present in a supply path of a voltage from the second power supply terminal to the output terminal and configured to supply the voltage from the second power supply terminal to the output terminal when the first switch unit is in the closed state (the ON state) and interrupt the supply of the voltage from the second power supply terminal to the output terminal when the first switch unit is in the open state (the OFF state), a first control unit configured to fix the first switch unit in the open state (the OFF state) on the basis of the voltage at the second power supply terminal, and a second control unit configured to release the fixing of the open state of the first switch unit (the OFF state) on the basis of the voltage at the first power supply terminal (T100).

Subsequently, a second power supply (the backup power supply 390 shown in FIG. 11) is connected to the second power supply terminal, a second power supply voltage (the voltage of the backup power supply 390 shown in FIG. 11) is applied to the second power supply terminal from the second power supply, and the first switch unit is fixed in the open state (T110).

The voltage output circuit 310 is incorporated in the electronic apparatus 300 (T120).

In a state in which the second power supply voltage is applied to the second power supply terminal, a first power supply (the main power supply 380 shown in FIG. 11) is connected to the first power supply terminal, a first power supply voltage (the voltage of the main power supply 380 shown in FIG. 11) is applied to the first power supply terminal from the first power supply, and the fixing of the open state of the first switch unit is released (T130).

Examples of a manufacturing method for the electronic apparatus 300 in this embodiment include a method of, after mounting the voltage output circuit 310 and the backup power supply 390 on one board, incorporating the board in the electronic apparatus 300 and, thereafter, further incorporating the main power supply 380 in the electronic apparatus 300 and connecting the main power supply 380 to the voltage output circuit 310. In the method, before the main power supply 380 is connected to the VDD terminal of the voltage output circuit 310, the backup power supply 390 is connected to the VBAT terminal. However, when a voltage is supplied to the VBAT terminal, the supply path of a voltage from the VBAT terminal to the VOUT terminal is interrupted. Therefore, during assembly of the electronic apparatus 300, it is possible to suppress useless consumption of the backup power supply 390. The manufacturing method is particularly effective when the backup power supply 390 is an un-rechargeable power supply such as a primary battery.

As the electronic apparatus 300, various electronic apparatuses are conceivable. Examples of the electronic apparatus 300 include personal computers (e.g., a mobile personal computer, a laptop personal computer, and a tablet personal computer), mobile terminals such as a smart phone and a cellular phone, a digital still camera, an inkjet-type discharge apparatus (e.g., an inkjet printer), storage area network devices such as a router and a switch, a local area network device, a television, a video camera, a video tape recorder, a car navigation apparatus, a real-time clock apparatus, a pager, an electronic notebook (including an electronic notebook with a communication function), an electronic dictionary, an electronic calculator, an electronic game machine, a controller for a game, a word processor, a work station, a video phone, a security television monitor, an electronic binocular, a POS terminal, medical apparatuses (e.g., an electronic thermometer, a sphygmomanometer, a blood sugar meter, an electrocardiogram apparatus, an ultrasonic diagnostic apparatus, and an electronic endoscope), a fish finder, various measuring apparatuses, meters (e.g., meters for a vehicle, an airplane, and a ship), a flight simulator, a head mounted display, motion trace, motion tracking, a motion controller, and PDR (pedestrian dead reckoning).

3. Moving Object

Figure 14:
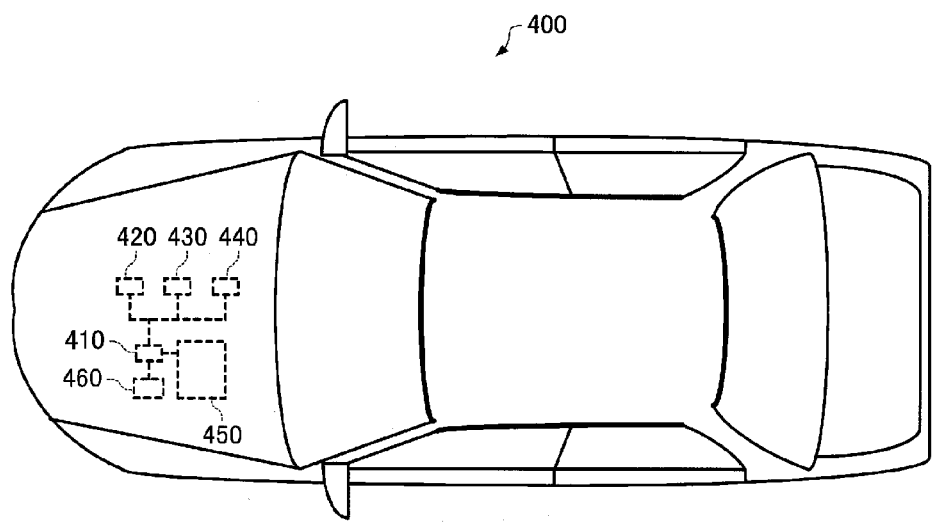
FIG. 14 is a diagram of an example of a moving object in the embodiment.

FIG. 14 is a diagram (a top view) showing an example of a moving object in this embodiment. A moving object 400 shown in FIG. 14 includes a voltage output circuit 410, controllers 420, 430, and 440 for performing various kinds of control for an engine system, a brake system, and a key-less entry system, a battery 450, and a backup battery 460. In the moving object in this embodiment, a part of the components (units) shown in FIG. 14 may be omitted or other components may be added.

The battery 450 supplies a main power supply voltage to a VDD terminal of the voltage output circuit 410.

The backup battery 460 supplies a backup power supply voltage to a VBAT terminal of the voltage output circuit 410.

A power supply voltage is supplied to the controllers 420, 430, and 440 from a VOUT terminal of the voltage output circuit 410.

When a voltage at the VDD terminal is higher than a predetermined voltage value, the voltage output circuit 410 outputs the voltage at the VDD terminal to the VOUT terminal. When the voltage at the VDD terminal is lower than the predetermined voltage value, the voltage output circuit 410 shifts to a backup mode and outputs a voltage at the VBAT terminal to the VOUT terminal. The voltage output circuit 410 is configured to interrupt a supply path of a voltage from the VBAT terminal to the VOUT terminal when a voltage is supplied to the VBAT terminal. As the voltage output circuit 410, for example, the voltage output circuit 1 in this embodiment can be applied.

It is possible to realize a moving object having higher reliability by incorporating the voltage output circuit 1 in this embodiment in the moving object 400.

As the moving object 400, various moving objects are conceivable. Examples of the moving object 400 include an automobile (including an electronic vehicle), airplanes such as a jet airplane and a helicopter, a ship, a rocket, and an artificial satellite.

4. Modifications

The invention is not limited to the embodiment and various modified implementations are possible without departing from the spirit of the invention.

For example, in the voltage output circuit in this embodiment, for example, when only an un-rechargeable power supply is connected as the backup power supply connected to the VBAT terminal, the switch circuit 32 (the switch element SW2) provided mainly for preventing overcharging of the backup power supply does not have to be provided.

For example, in the voltage output circuit in this embodiment, the power supply determination circuit VDET2 may be deleted by causing the power supply determination circuit VDET1 to also function as the power supply determination circuit VDET2. Similarly, in the voltage output circuit in this embodiment, the power supply determination circuit VDET4 may be deleted by causing the power supply determination circuit VDET3 to also function as the power supply determination circuit VDET4.

For example, in the voltage output circuit in this embodiment, a pull-down resistor and a switch may be connected in series between the VDD terminal and the ground. The switch control circuit 20 may be modified to control timing of ON/OFF of the switch. For example, the switch control circuit 20 may control the switch to be turned on when at least one of the power supply determination circuits VDET1 to VDET5 is turned on. Consequently, charges at the VDD terminal are periodically forcibly discharged via the pull-down resistor. Therefore, when the main power supply is interrupted, an electric current flowing into the VDD terminal and an electric current flowing out of the VDD terminal tend to be unbalanced and a voltage drop at the VDD terminal is further promoted. As a result, the voltage drop at the VDD terminal is surely detected by the power supply determination circuit VDET1 or VDET2. It is possible to more quickly shift to the backup mode. It is possible to reduce a consumed current by the pull-down resistor by providing a switch in series to the pull-down resistor and intermittently turning on and off the switch.

For example, in the manufacturing method for the voltage output circuit in this embodiment shown in FIG. 8, after the step T20 for applying the second power supply voltage to the second power supply terminal from the second power supply, in the state in which the second power supply voltage is applied to the second power supply terminal, the step T30 for applying the first power supply voltage from the first power supply is performed. However, the manufacturing method may be modified to, after a step for applying the first power supply voltage to the first power supply terminal from the first power supply, in a state in which the first power supply voltage is applied to the first power supply terminal, apply the second power supply voltage to the second power supply terminal from the second power supply. Similarly, in the manufacturing method for the electronic apparatus in this embodiment shown in FIG. 13, after the step T110 for applying the second power supply voltage to the second power supply terminal of the voltage output circuit from the second power supply, in the state in which the second power supply voltage is applied to the second power supply terminal of the voltage output circuit, the step T130 for applying the first power supply voltage to the first power supply terminal of the voltage output circuit from the first power supply is performed. However, the manufacturing method may be modified to, after applying the first power supply voltage to the first power supply terminal of the voltage output circuit from the first power supply, in a state in which the first power supply voltage is applied to the first power supply terminal of the voltage output circuit, apply the second power supply voltage to the second power supply terminal of the voltage output circuit from the second power supply.

For example, in the manufacturing method for the electronic apparatus shown in FIG. 13, after the step T110 for applying the second power supply voltage to the second power supply terminal of the voltage output circuit from the second power supply, the step T120 for incorporating the voltage output circuit in the electronic apparatus is performed. However, the order of the step 110 and the step 120 may be changed to perform the step T110 after the step T120. Examples of the manufacturing method for the electronic apparatus 300 include a method of, after incorporating the backup power supply 390 in the electronic apparatus 300, incorporating the voltage output circuit 310 in the electronic apparatus 300 and connecting the voltage output circuit 310 to the backup power supply 390 and, thereafter, further incorporating the main power supply 380 in the electronic apparatus 300 and connecting the main power supply 380 to the voltage output circuit 310. In the method, as in the manufacturing method explained above, before the main power supply 380 is connected to the VDD terminal of the voltage output circuit 310, the backup power supply 390 is connected to the VBAT terminal. However, when a voltage is supplied to the VBAT terminal, the supply path of a voltage from the VBAT terminal to the VOUT terminal is interrupted. Therefore, during assembly of the electronic apparatus 300, it is possible to suppress useless consumption of the backup power supply 390. The manufacturing method is particularly effective when the backup power supply 390 is an un-rechargeable power supply such as a primary battery.

The embodiment and the modifications explained above are examples. The invention is not limited to the embodiment and the modifications. For example, the embodiment and the modifications can be combined as appropriate.

The invention includes components substantially the same as the components explained in the embodiments (e.g., components having the same functions, methods, and results or components having the same purposes and effects). The invention includes components in which non-essential portions of the components explained in the embodiments are replaced. The invention includes components that can realize action and effects or attain objects same as those of the components explained in the embodiments. The invention includes components in which publicly-known techniques are added to the components explained in the embodiments.

The entire disclosure of Japanese Patent Application No. 2013-153578, filed Jul. 24, 2013 is expressly incorporated by reference herein.

What is claimed is:

1. A voltage output circuit comprising:
   a first power supply terminal;
   a second power supply terminal;
   an output terminal;
   a first switch unit present in a supply path of a voltage from the second power supply terminal to the output terminal and configured to supply the voltage from the second power supply terminal to the output terminal when the first switch unit is in a closed state and interrupt the supply of the voltage from the second power supply terminal to the output terminal when the first switch unit is in an open state;
   a first control unit configured to fix the first switch unit in the open state on the basis of the voltage at the second power supply terminal; and
   a second control unit configured to release the fixing of the open state of the first switch unit on the basis of the voltage at the first power supply terminal.

2. The voltage output circuit according to claim 1, wherein the first control unit includes a power-on reset circuit configured to output a reset signal according to application of the voltage from the second power supply terminal and fixes the first switch unit in the open state according to the reset signal.

3. The voltage output circuit according to claim 2, wherein
   the first switch unit includes a switch element, and
   the first control unit applies fixed potential to a control terminal of the switch element according to the reset signal and fixes the first switch unit in the open state.

4. The voltage output circuit according to claim 3, wherein the switch element of the first switch unit includes a diode forward-connected in a direction from the output terminal to the second power supply terminal.

5. The voltage output circuit according to claim 2, wherein the second control unit outputs a release signal on the basis of the voltage at the first power supply terminal, and the first control unit includes a latch circuit and fixes the switch unit in the open state on the basis of an input of the reset signal to the latch circuit and releases the fixing of the open state of the first switch unit on the basis of an input of the release signal to the latch circuit.

6. The voltage output circuit according to claim 1, further comprising a second switch unit present on a supply path of the voltage from the first power supply terminal to the output terminal and configured to interrupt the supply of an electric current from the second power supply terminal to the first power supply terminal when the second switch is in the open state.

7. An electronic apparatus comprising the voltage output circuit according to claim 1.

8. An electronic apparatus comprising the voltage output circuit according to claim 2.

9. An electronic apparatus comprising the voltage output circuit according to claim 3.

10. An electronic apparatus comprising the voltage output circuit according to claim 4.

11. A moving object comprising the voltage output circuit according to claim 1.

12. A moving object comprising the voltage output circuit according to claim 2.

13. A moving object comprising the voltage output circuit according to claim 3.

14. A manufacturing method for a voltage output circuit comprising:

preparing a circuit including a first power supply terminal, a second power supply terminal, an output terminal, a first switch unit present in a supply path of a voltage from the second power supply terminal to the output terminal and configured to supply the voltage from the second power supply terminal to the output terminal when the first switch unit is in a closed state and interrupt the supply of the voltage from the second power supply terminal to the output terminal when the first switch unit is in an open state, a first control unit configured to fix the first switch unit in the open state on the basis of the voltage at the second power supply terminal, and a second control unit configured to release the fixing of the open state of the first switch unit on the basis of the voltage at the first power supply terminal;

applying a second power supply voltage to the second power supply terminal of the first power supply terminal and the second power supply terminal and fixing the first switch unit in the open state; and applying a first power supply voltage to the first power supply terminal in a state in which the second power supply voltage is applied to the second power supply terminal and releasing the fixing of the open state of the first switch unit.

15. A manufacturing method for an electronic apparatus comprising:

preparing a voltage output circuit including a first power supply terminal, a second power supply terminal, an output terminal, a first switch unit present in a supply path of a voltage from the second power supply terminal to the output terminal and configured to supply the voltage from the second power supply terminal to the output terminal when the first switch unit is in a closed state and interrupt the supply of the voltage from the second power supply terminal to the output terminal when the first switch unit is in an open state, a first control unit configured to fix the first switch unit in the open state on the basis of the voltage at the second power supply terminal, and a second control unit configured to release the fixing of the open state of the first switch unit on the basis of the voltage at the first power supply terminal;

applying a second power supply voltage to the second power supply terminal of the first power supply terminal and the second power supply terminal and fixing the first switch unit in the open state;

applying a first power supply voltage to the first power supply terminal in a state in which the second power supply voltage is applied to the second power supply terminal and releasing the fixing of the open state of the first switch unit; and incorporating the voltage output circuit in the electronic apparatus after the applying of the second power supply voltage and before the applying of the first power supply voltage.

* * * * *